US006167933B1

(12) United States Patent
De Vale et al.

(10) Patent No.: US 6,167,933 B1
(45) Date of Patent: Jan. 2, 2001

(54) APPARATUS AND METHOD FOR AUTOMATICALLY INSERTING MARKERS INTO BOOKS

(75) Inventors: Donald P. De Vale, Bloomingdale, IL (US); Peter J. Zarembo, Shoreview, MN (US); James L. Allen, Lake Villa, IL (US); Philip M. Anthony, III, Chicago, IL (US); Randall P. Bell, River Forest, IL (US); Aaron B. Eiger, Evanston, IL (US); Gerald Fleischfresser; Gregory W. Lantz, both of Wheaton, IL (US); Emily Matz, Highland Park, IL (US); Glenn A. Newby, New Richmond, WI (US); Kurt T. Peterson, Mt. Prospect, IL (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/118,116

(22) Filed: Jul. 17, 1998

Related U.S. Application Data

(62) Division of application No. 08/622,576, filed on Mar. 25, 1996, now Pat. No. 5,843,272.

(51) Int. Cl.[7] .......................................................... B32B 31/00

(52) U.S. Cl. .......................... 156/358; 156/362; 156/494; 156/540; 156/541; 156/542; 156/569

(58) Field of Search .................................... 156/541, 521, 156/350, 540, 542, 569, 570, 571, 572, 556, 362, 358, 494; 270/58.32, 58.31

(56) References Cited

U.S. PATENT DOCUMENTS 3,765,007 * 10/1973 Elder .................................... 340/280
4,717,438 * 1/1988 Benge et al. ......................... 156/152
4,773,961 * 9/1988 Glorioso .............................. 156/361
4,900,386 * 2/1990 Richter-Jorgensen ................ 156/250
4,967,185 * 10/1990 Montean ............................. 340/572
5,331,313 * 7/1994 Koning ................................ 340/551
5,393,368 * 2/1995 Stevens ............................... 156/577
5,587,043 * 12/1996 Hying et al. ......................... 156/566

FOREIGN PATENT DOCUMENTS

2132054 * 3/1995 (CA) .
44 04 103 * 2/1994 (DE) .
0 286 343 * 12/1988 (EP) .
0 353 688 * 3/1991 (EP) .
0 459 722 * 12 1991 (EP) .

* cited by examiner

*Primary Examiner*—Linda L. Gray
(74) *Attorney, Agent, or Firm*—Peter L. Olson

(57) ABSTRACT

A book marker insertion apparatus includes a cartridge assembly, a separator assembly, a gripper assembly, an elevator assembly and a page spreader assembly. The cartridge assembly holds a roll of marker material including a plurality of markers on a backing sheet and advances the material to the separator assembly. The separator assembly includes jaws and a peel bar for removing the endmost marker from the backing sheet. The gripper assembly includes rotatable arms which grip the separated end marker and position the separated end marker for insertion into the book. The elevator raises and lowers the gripper assembly from the position for gripping the separated end marker to the position for inserting into the book. The page spreader assembly includes a V-arm with a slot formed therein-for receiving the gripper arms and the separated end marker.

23 Claims, 23 Drawing Sheets

APPARATUS AND METHOD FOR AUTOMATICALLY INSERTING MARKERS INTO BOOKS

This is a division of application Ser. No. 08/622,567 filed Mar. 25, 1996 now U.S. Pat. No. 5,843,272, issued Dec. 1, 1998.

BACKGROUND OF THE INVENTION

1. Field of the Invention

The present invention is directed to a method and apparatus for automatically inserting a marker into a book near the binding.

2. Description of the Prior Art

Theft is a continually growing problem in society, requiring additional security measures to minimize theft. In particular, many stores and other places of business have installed electronic article surveillance systems (EAS) for controlling unauthorized removal of articles. Such systems use a single or dual status ferromagnetic marker attached to an article with systems at exits which detect the markers and sound an alarm.

Bookstores and libraries have special problems with theft of books, which are easily concealed. Libraries rarely have surveillance systems and typically have very limited resources for security personnel. Libraries cannot afford the expense of stolen books and, in many instances, libraries lose books which are very rare and irreplaceable. Bookstores try to minimize shoplifting of expensive inventory which is easily accessible and which may be difficult to monitor in crowded stores.

Special EAS systems have been developed for libraries and bookstores. The markers and attachment methods used with clothing and many other articles cannot be easily attached to books without damaging the book. EAS ferromagnetic markers for use in books are typically long narrow strips that are manually inserted between two opposing pages of a book, close to and extending substantially parallel to the binding. Each side of the marker is typically coated with an adhesive to secure the marker to the book pages. When properly placed, the markers are difficult to visually detect, difficult to remove, and do not detract from the reader's ability to read and enjoy the book. The markers must be deactivated when articles marked with them are checked out of libraries or purchased in stores so that an alarm does not sound.

It can be appreciated that for such systems to function effectively, all the books in a library collection must include a detectable marker. The markers heretofore have been manually removed from a box of markers and inserted into a book. Manual removal and insertion of markers in libraries may be acceptable when the collection is quite small, however manual insertion methods may not be acceptable with larger collections.

The markers are typically manufactured in a roll on a backing sheet with an adhesive backing on both the front and back to adhere to the pages of the book, as described in U.S. Pat. No. 5,331,313, assigned to Minnesota Mining and manufacturing Company. Individual strips are cut from the roll for insertion. Each marker includes overlapping backing material on each face. The process of removing an individual backing sheet from the adhesive coated marker and manually inserting and positioning each individual marker is very laborious, expensive and time consuming for large collections.

In addition to time and expense involved with manual insertion, the quality of positioning each marker may vary with manual placement. It is appreciated that if markers having adhesive on both sides are placed on the page too far from the binding, it will be more difficult for the reader to turn the pages and the pages between which the marker is inserted will not be sufficiently separated and may be difficult to read. Similar problems also occur should the marker be placed into the book is a skewed or bowed manner. The handling of the markers with manual insertion may also unduly stress or otherwise damage the strips. When this occurs, signal loss may become great enough that the markers may not be accurately detected. In addition, since the markers are typically stored in a container without alignment or protection, the individual markers may be easily twisted, bent or otherwise damaged during shipping or storage.

As access to books is somewhat difficult in some libraries, often requiring a ladder to reach, it is important that the books need not necessarily be transported to a central location for marker insertion. Therefore it will be appreciated that if an insertion device is mobile so that it may be brought either into the aisles between book shelves or at least to different locations within the library, the work involved in transporting books to the device is decreased.

It can be seen then, that a new and improved method is needed for inserting a detectable marker between opposing pages of a book. It can be appreciated that such a device and method should be substantially automated to insert and properly position a marker between pages of an open book. In addition, the device should provide for automatically removing the markers from a roll or other packaging of multiple markers. The device should attach each marker between the spread opposed pages of the book near the binding in a substantially identical position. Such a device should be adaptable for inserting markers into a variety of sizes and types of books. The present invention addresses these as well as other problems associated with insertion and placement of detectable markers used with books.

SUMMARY OF THE INVENTION

The present invention is directed to a method and apparatus for automatically inserting markers between opposed pages of books near the binding. The present invention provides for automatically removing a marker from a roll of detectable marker material and inserting the separated marker between the opposed pages of a book.

The insertion apparatus includes a base which receives a sliding tray for supporting a book, with an assemblies' housing supported above the book. The housing includes a cartridge assembly which receives a roll of magnetic markers, as well as a separator assembly for removing the markers from the backing sheet of the roll. A gripper assembly receives the separated markers and is rotatably mounted so that the removed marker may be lowered with and extended into the space between the opposed pages on an elevator assembly. A V-arm type assembly is utilized for guiding the marker into. position and for providing adequate separation of the opposed pages to allow full insertion of a marker. A processor receives input from sensors and controls stepper motors and solenoids to detect the position of the marker and to insert the marker properly into the book and advance the roll.

The cartridge assembly includes a handle and a frame and is removable from the housing so that the roll may be mounted thereto. The cartridge assembly includes guide rollers which feed the length of material and drive rollers which pull the material from the roll. The material passes over a peel bar which bends the backing sheet so that each marker having adhesive applied to its surfaces is peeled away from the backing sheet. Left and right drive rollers are preferably independently driven so that the roll may be pulled by either end to maintain proper alignment.

The separator assembly includes moveable jaws which are located proximate the peel bar and which provide for clamping against an end marker peeled away from the backing sheet. Solenoids actuate the jaws to clamp onto the marker and also provide for movement of the clamped jaws horizontally away from the peel bar to separate the end marker from the next adjacent marker. Sensors indicate the presence of both ends of the marker and signal whether the marker is sufficiently advanced and properly positioned.

The gripper assembly includes a pair of rotatably mounted arms driven by a motor with fingers which clamp to a closed position and spread to an open position for grabbing end portions of the markers. The end portions of each marker preferably do not have adhesive applied thereto so that the marker does not adhere to the surfaces of the gripper arm fingers. The fingers are actuated by a solenoid to pivot the fingers open and closed. The gripper arms are pivotally mounted and are biased outward by tension springs. As the separator jaws are moved towards the gripper arms, guide posts extending from the arms engage ramp portions on the separator jaws to move the arms slightly inward. At this position, the fingers close to grip the marker. The gripper assembly is then raised so that the guide posts disengage the ramp portions, the tension springs pull the arms outward to provide for gripping the marker so that it is held in a taut, unbowed position. When the marker has been gripped by the fingers, the gripper assembly is rotated so that the arms extend substantially downward until a position sensor detects the gripper arms are extending downward at the proper angle. The elevator assembly then lowers the gripper assembly so that the marker is placed intermediate the opposed pages of the book.

The elevator assembly includes a counterweight to decrease the power needed for raising and lowering the gripper assembly. A drive motor connects to a ribbed belt for driving a pulley on the gripper assembly for raising and lowering. The elevator also includes sensors for indicating. that the elevator has lowered the arms to the correct depth for inserting the marker into the book and that the assembly has been properly raised for gripping markers from the separator jaws.

The book is held on a tray table which is slidable inward and outward from below the gripper assembly. When in the fully inserted position, a table lock maintains the tray and a sensor indicates that the book is positioned for receiving a marker. A V-type arm assembly is positioned above the book and is vertically slidable to engage the opposed pages of the book and provide for further separation. The slot extends at the bottom of the V-arm assembly and has a widened end portion for receiving the ends of the gripper arms. When the elevator depth sensor detects that the gripper is lowered the correct distance, the gripper fingers are pivoted to an open position to release the marker and place it proximate the binding of the book.

Following placement of the marker, the elevator raises the gripper assembly and the arms are rotated back to a substantially horizontal position. The roll is then advanced to remove the next marker and have it gripped between the fingers ready for insertion into the next book. When the gripper assembly is raised, the table lock disengages. The tray is slid outward following placement of the marker and the arm assembly raised so that the book can be removed and a new book inserted.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT

Figure 1:
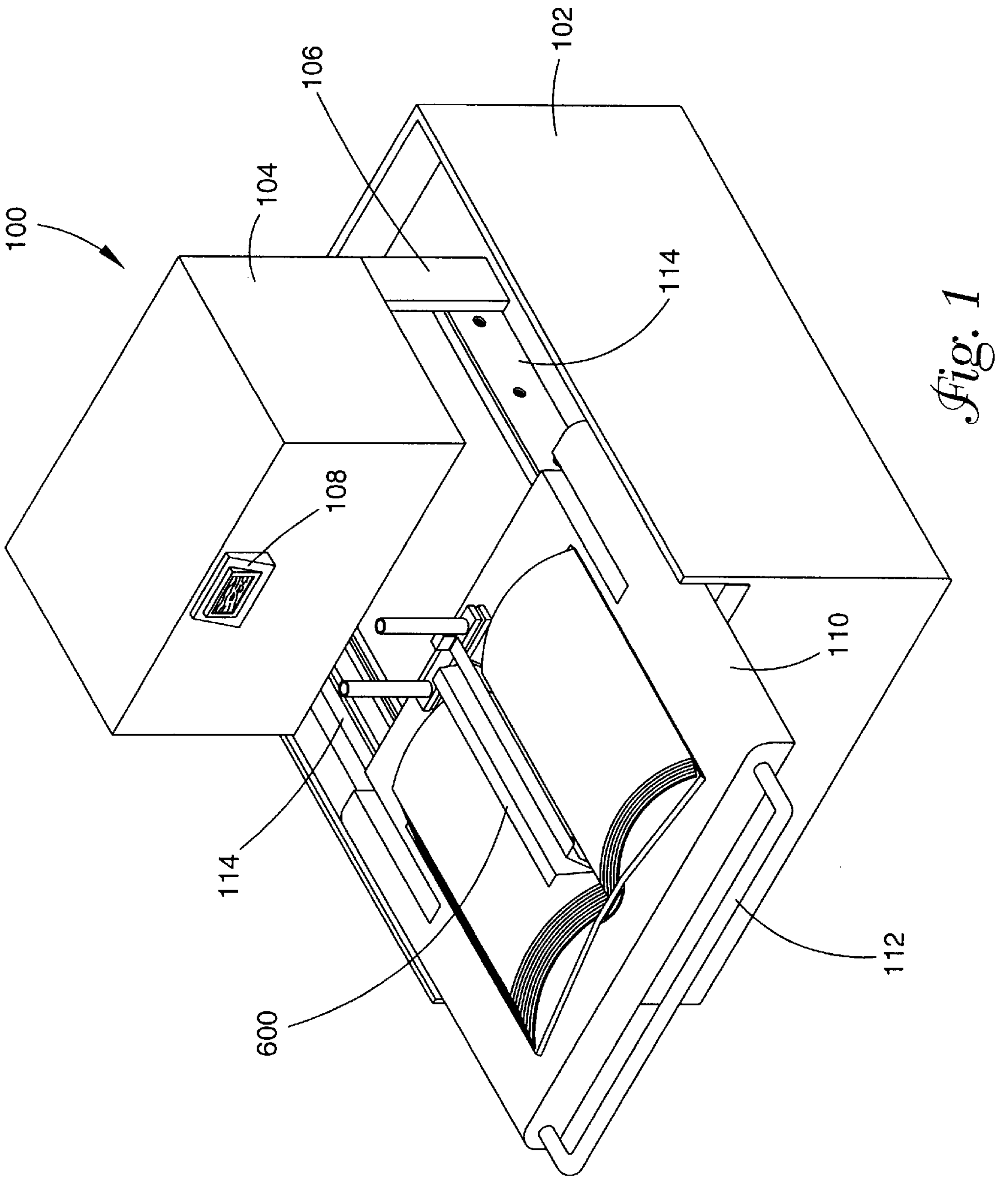
FIG. 1 shows a perspective view of a marker insertion apparatus according to the principles of the present invention with the loading tray out.

Referring now to the drawings, and in particular to FIG. 1, there is shown an apparatus for inserting detectable markers into books, generally designated 100. The markers are electronic article surveillance ferromagnetic strips which are inserted between two opposing pages of the book close to the binding. The preferred markers are described in commonly assigned U.S. patent application Ser. No. 08/621,272, entitled EAS MARKER ASSEMBLIES, now U.S. Pat. No. 5,847,649 filed on even date herewith, and incorporated herein by reference. The marker insertion apparatus 100 includes a base 102 which houses components such as a long-life, marine-type battery and other equipment. The base 102 may be mounted on a cart or integrally formed therewith to provide for mobility of the apparatus or it may be permanently mounted or configured for mounting on a desk or table top.

The base 102 supports a housing 104 on supports 106. The housing 104 includes various assemblies for removing markers from a length of marker material. As explained hereinafter, the present invention automatically removes an end marker and places it in the book parallel with and proximate to the binding.

The book is supported on a sliding tray 110 having a handle 112 extending from a first end thereof. The tray 110 slides from a marker insertion position shown in FIG. 2, to an accessible position shown in FIG. 1, by sliding the tray 110 on rails 114. A sensor linked to a central processor detects when the tray 110 is slid fully to the correct marker insertion position. The tray 110 also includes a lock linked to the processor for retaining the tray 110 in the insertion position under the housing 104.

A page-spreader system, generally designated 600, includes a V-arm assembly 602 inserting between adjacent pages of the book. The V-arm assembly 602 keeps the pages spread apart and allows the markers to be inserted therebetween. The page-spreader system 600 generally includes an arm member 604 sliding vertically on support posts 606, as explained hereinafter. The page spreader system 600 also includes a flag 670 read by the sensor 464 to indicate the depth at which the arm member 604 is lowered for controlling insertion depth of the markers.

The housing 104 includes a control panel display screen 108 which provides various messages. For example, the screen may provide user information as to the number of markers which have been inserted, alerts of jamming problems within the assemblies, indication of the supply of marker material running empty, indication of the apparatus being ready for insertion, and other messages as may be required.

Figure 3:
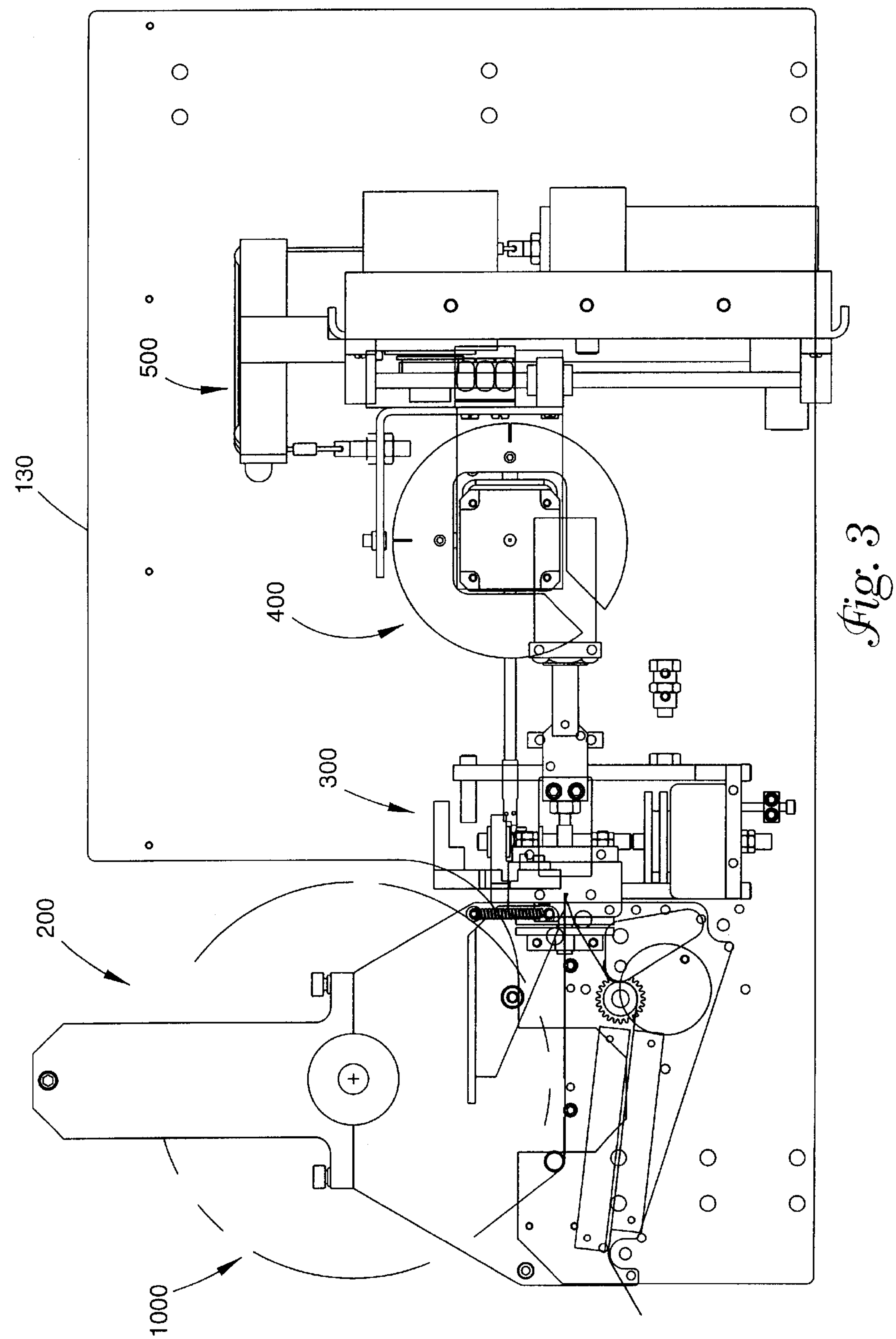
FIG. 3 shows a side elevational view of the cartridge assembly, the separator assembly, the gripper assembly and the elevator assembly for the apparatus shown in FIG. 1.

Referring now to FIG. 3, the various assemblies within the housing 104 required for removing markers and inserting them into the book are shown. The insertion apparatus 100 includes a cartridge assembly, generally designated 200, which holds a roll 1000 of marker material and feeds the roll 1000 for removal of the end marker. The end marker is pulled from the roll by a separator assembly, generally designated 300. The separator assembly 300 removes the endmost marker from the roll 1000 and positions it for transporting to insertion. The marker is inserted with a gripper assembly, generally designated 400, which takes the removed marker from the separator assembly 300 and inserts it into the book, as explained hereinafter. The gripper assembly 400 is mounted on an elevator assembly, generally designated 500, which raises and lowers the gripper assembly 400 for receiving the markers from the separator assembly 300 and lowering them between opposed pages of a book.

Figure 4:
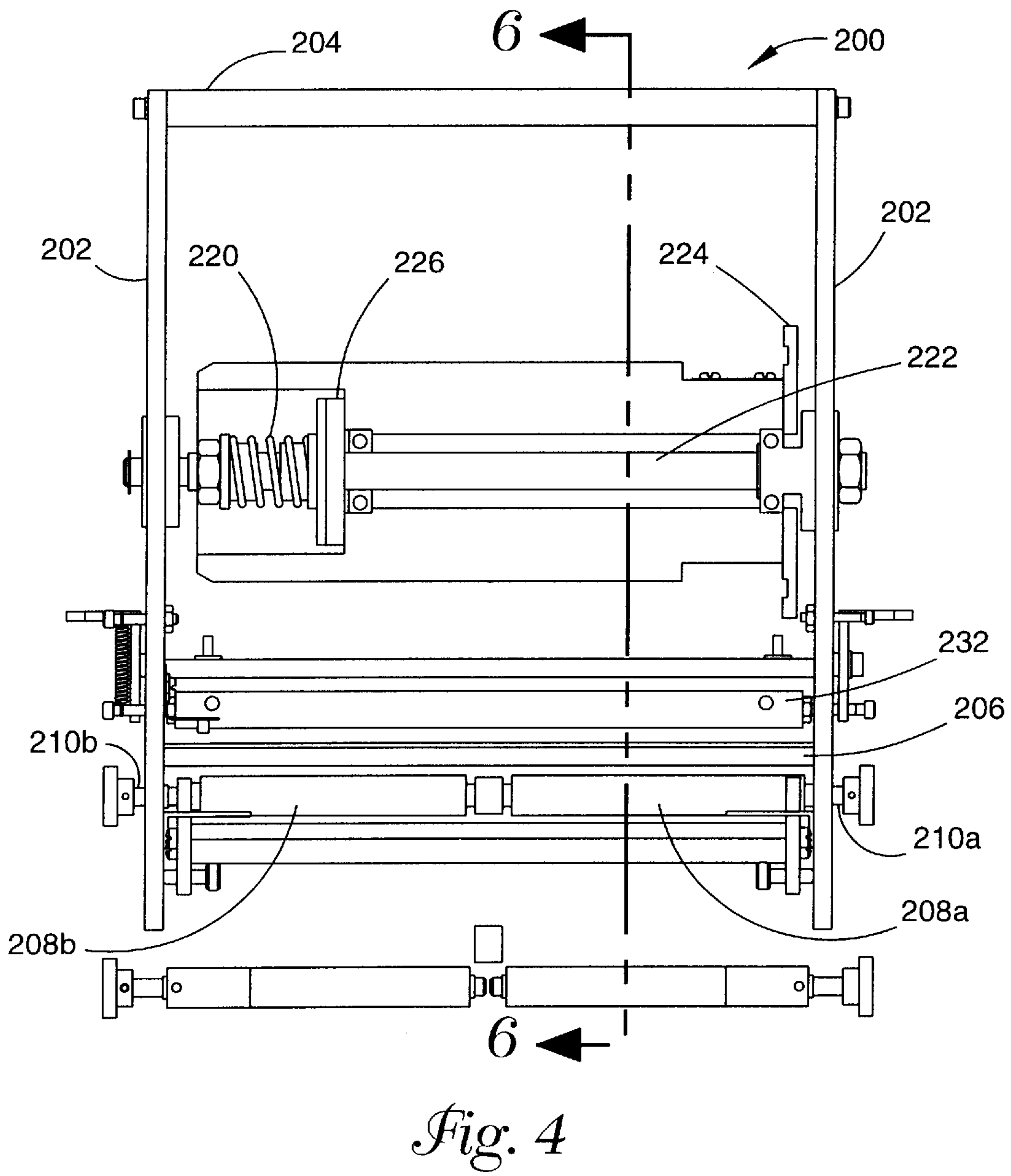
FIG. 4 shows an end elevational view of the marker. roll cartridge for insertion apparatus shown in FIG. 3.
Figure 5:
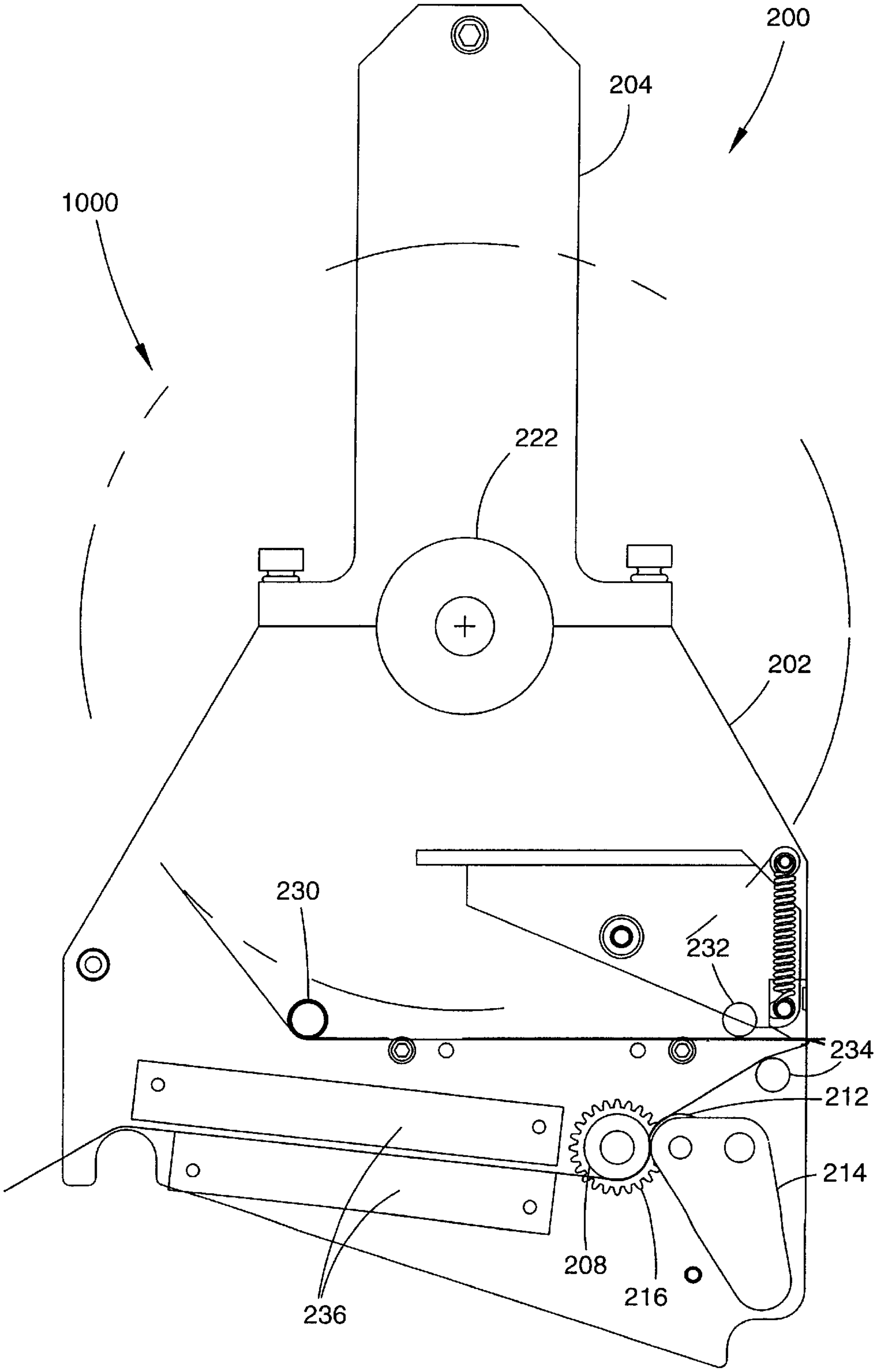
FIG. 5 shows a side elevational view of the marker roll cartridge shown in FIG. 4.
Figure 6:
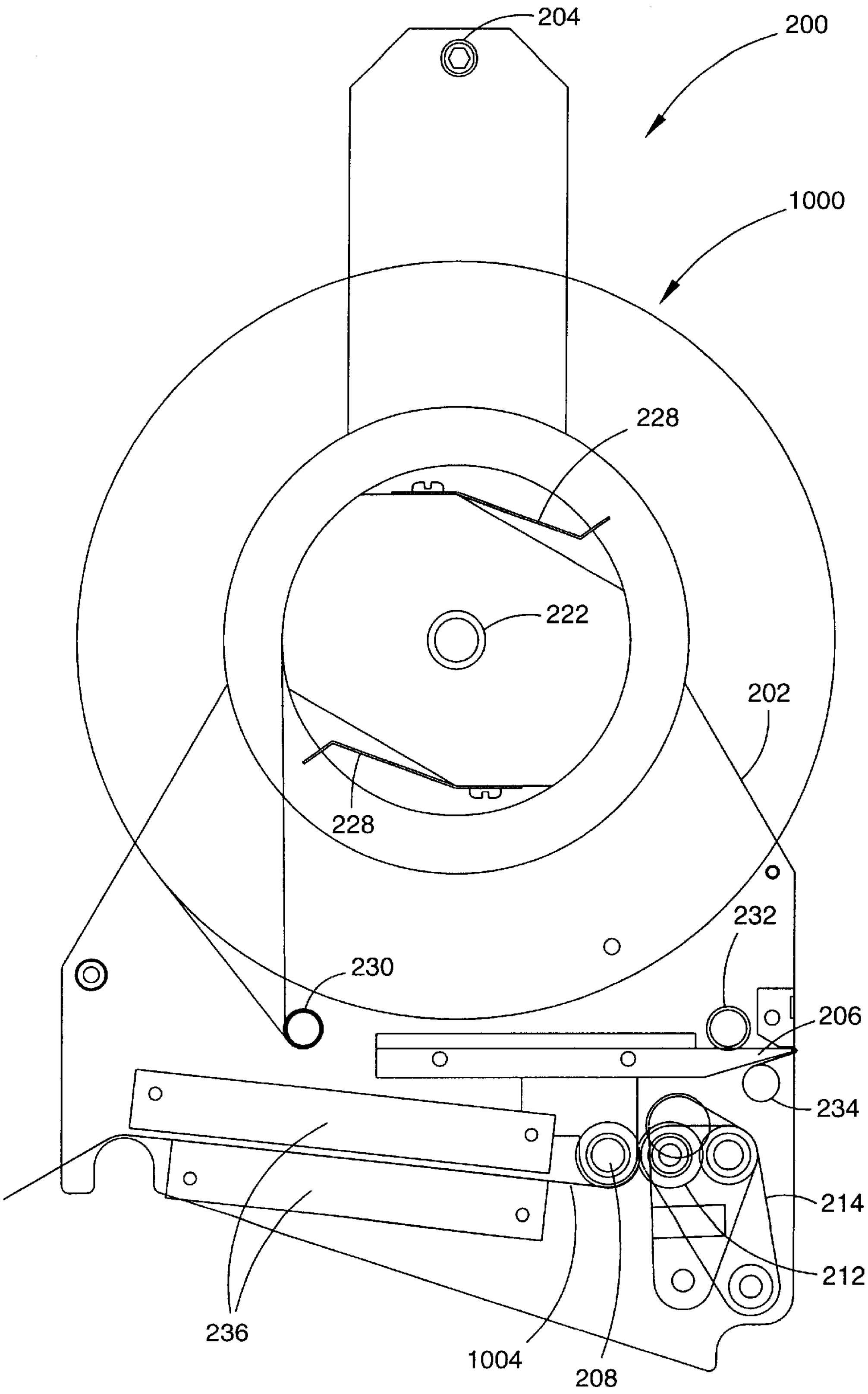
FIG. 6 shows a sectional view of the cartridge taken along line 6—6 of FIG. 4.

Referring now to FIGS. 4, 5 and 6, the cartridge assembly 200 includes a frame 202 and a handle 204 which allow for insertion and removal of the cartridge 200 into the assemblies frame 130, as shown in FIG. 3. The frame 202 holds a spindle 222 which receives the roll 1000 of electronic article surveillance markers. The roll 1000 is a substantially continuous roll of marker material with the adjacent individual markers separated, but typically connected by the adhesive coating layer, as shown most clearly in FIGS. 11–13. The marker material is mounted to a continuous backing sheet or liner which is peeled away from the markers, as explained hereinafter. The continuous web is wound around guide rollers 230 and 232 to a peel bar 206. As explained hereinafter, on removal of the end marker, the backing sheet is pulled outward for disposal or recycling through guide rollers 234 and drive rollers 208 which pull the material from the roll. In the preferred embodiment, the drive rollers 208 are separated into an independently driven left drive roller 208A and an independently driven right drive roller 208B mounted on a left drive shaft 210A and a right drive shaft 210B, respectively. The drive shafts 210A and 210B are driven by associated drive gears 216 respectively.

The drive system provides for positioning of the marker should the roll 1000 become misaligned. In the event that one marker end is out of alignment with the opposite marker end as detected by sensors on the separator jaws, one of the drive rollers 208A or 208B may be advanced as necessary to bring the web of material back into proper alignment. An idler roller 212 mounted on the bracket 214 provides for tensioning and alignment of the backing sheet against the drive rollers 208.

The roll 1000 is held on the spindle 222 with an end bracket 224 and a sliding plunger 226. Radial springs 228 extend radially outward to engage the inner mounting tube portion of the roll 1000. A compression spring 220 provides tension against the sides of the roll to prevent over rotation when the material is fed from the roll and to hold the roll 1000 when markers are being pulled from the backing sheet and the next adjacent marker. In addition, the cartridge assembly 200 includes threading plates 236 for directing the backing sheet after removal of the markers.

Figure 7:
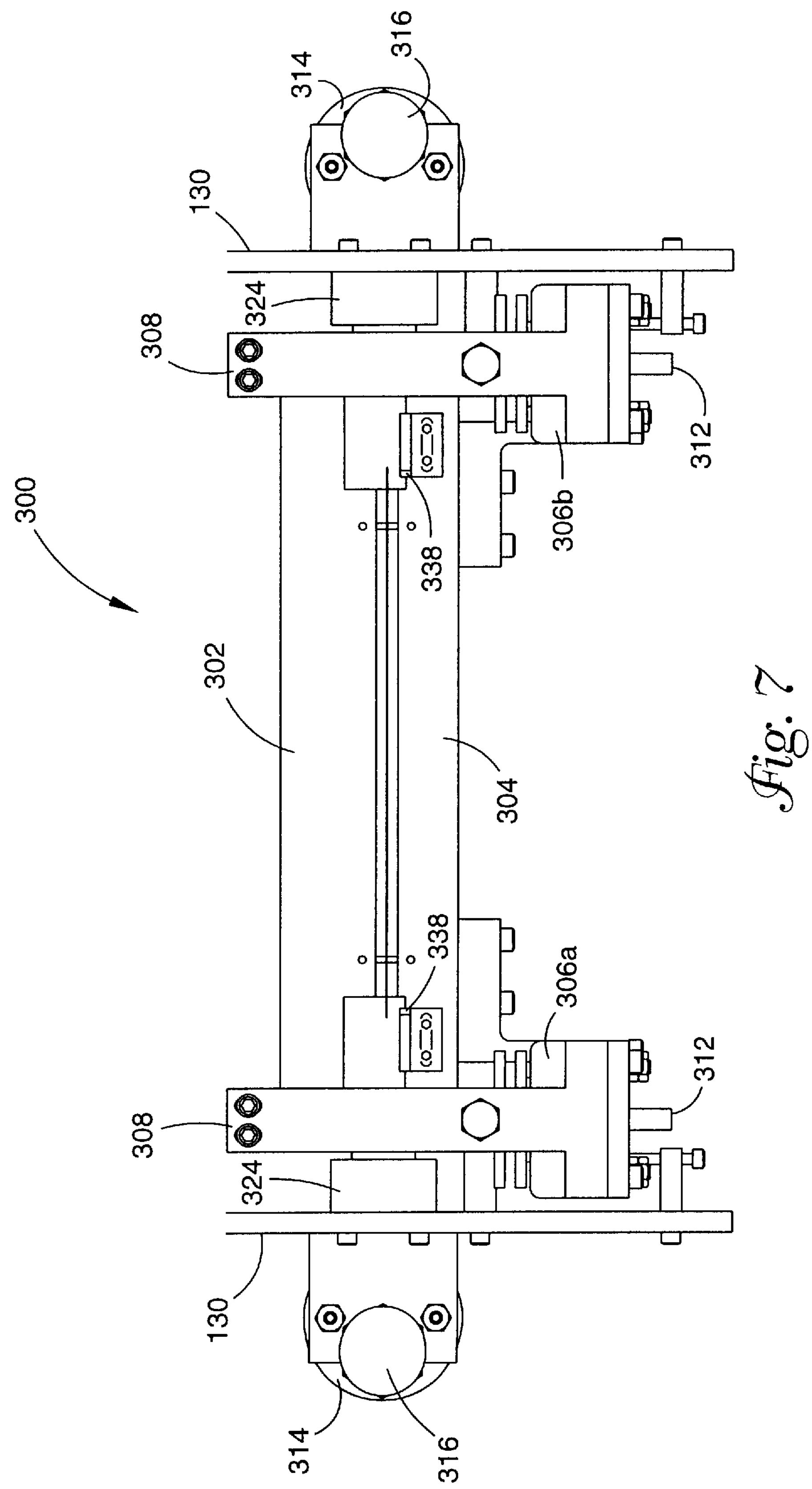
FIG. 7 shows an top elevational view of the separator assembly shown in FIG. 3.
Figure 8:
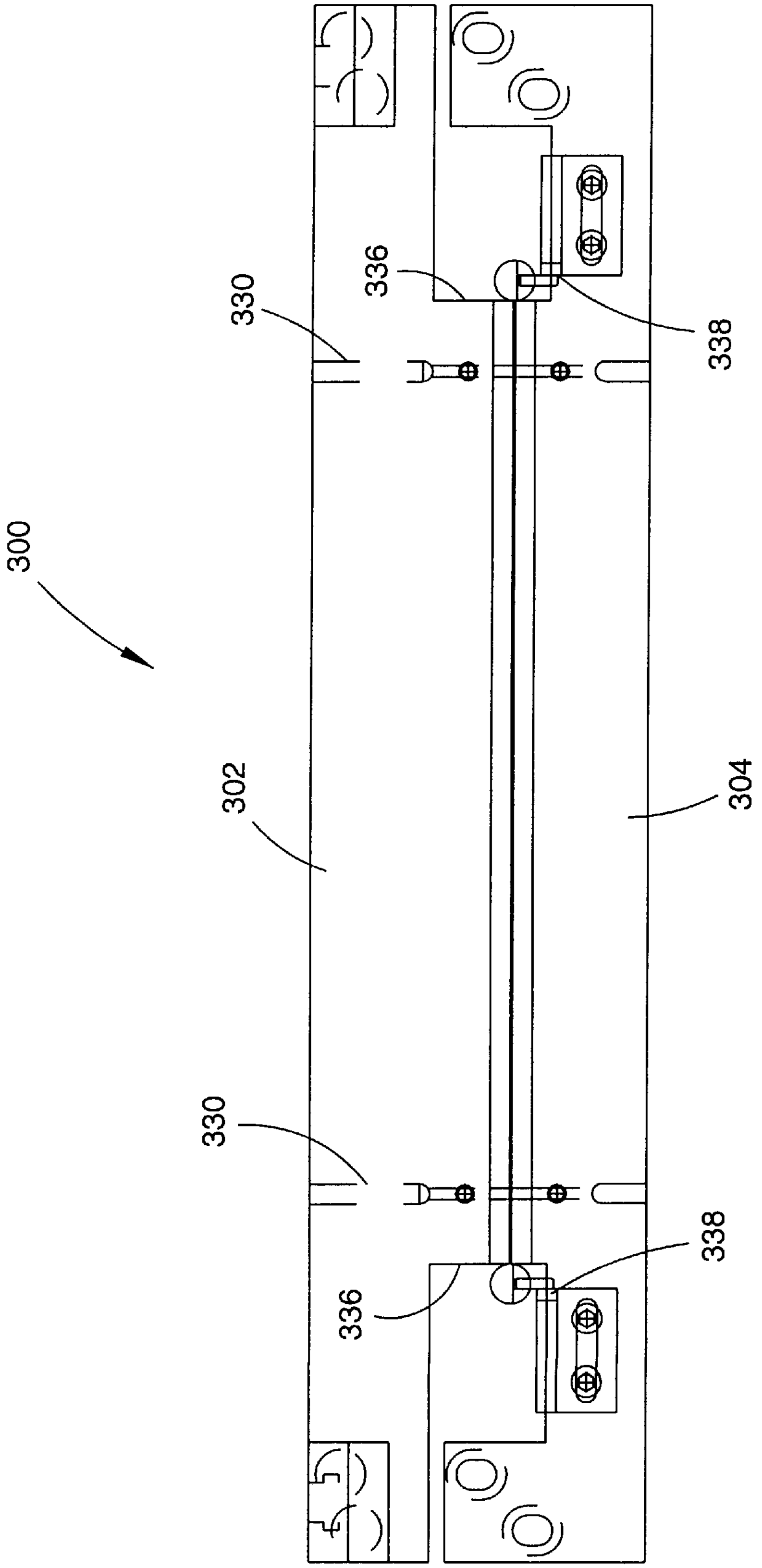
FIG. 8 shows a detail end elevational view of the jaws of the separator assembly shown in FIG. 7.
Figure 9:
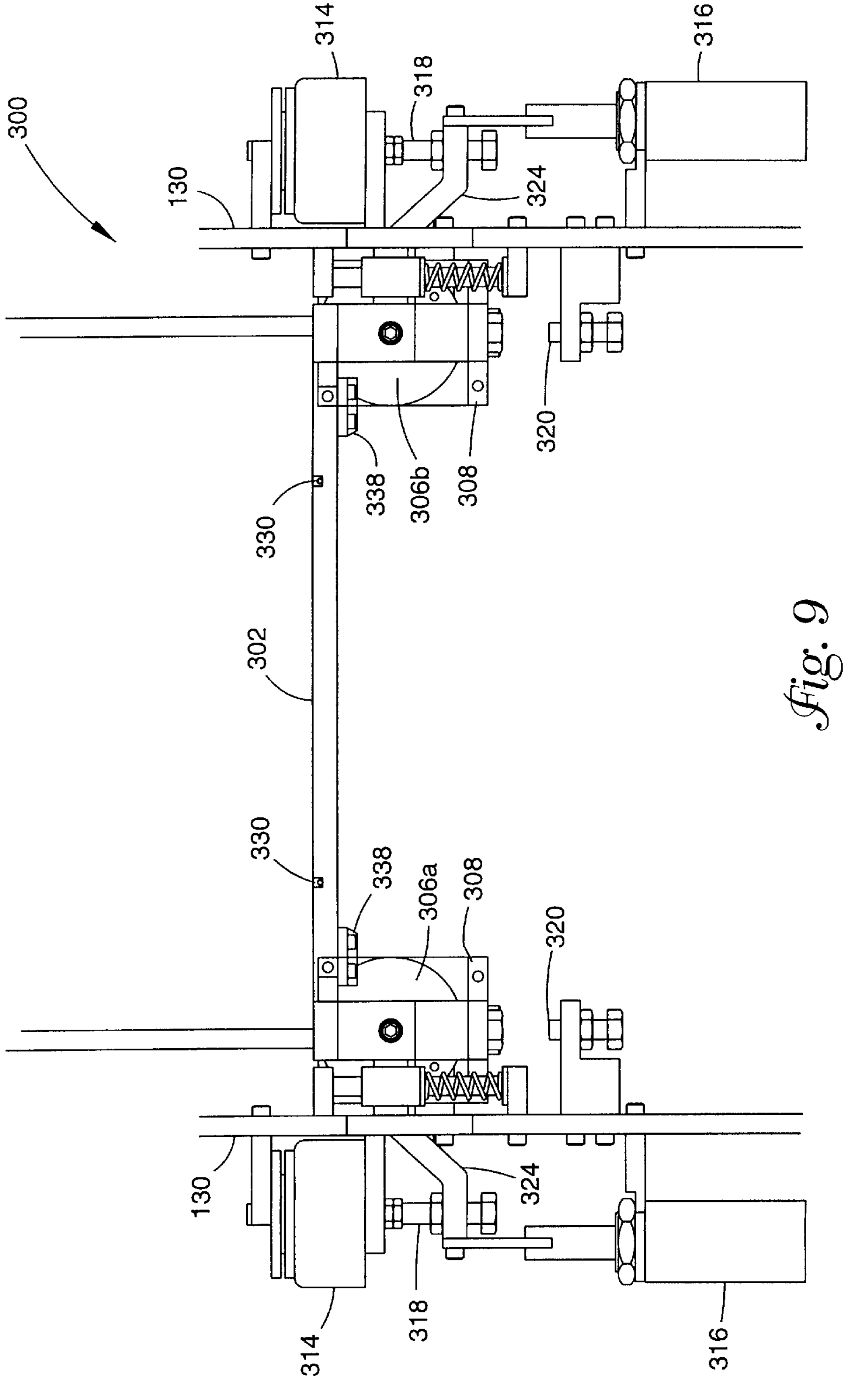
FIG. 9 shows a end plan view of the solenoid actuator system for the separator assembly shown in FIG. 7.
Figure 10:
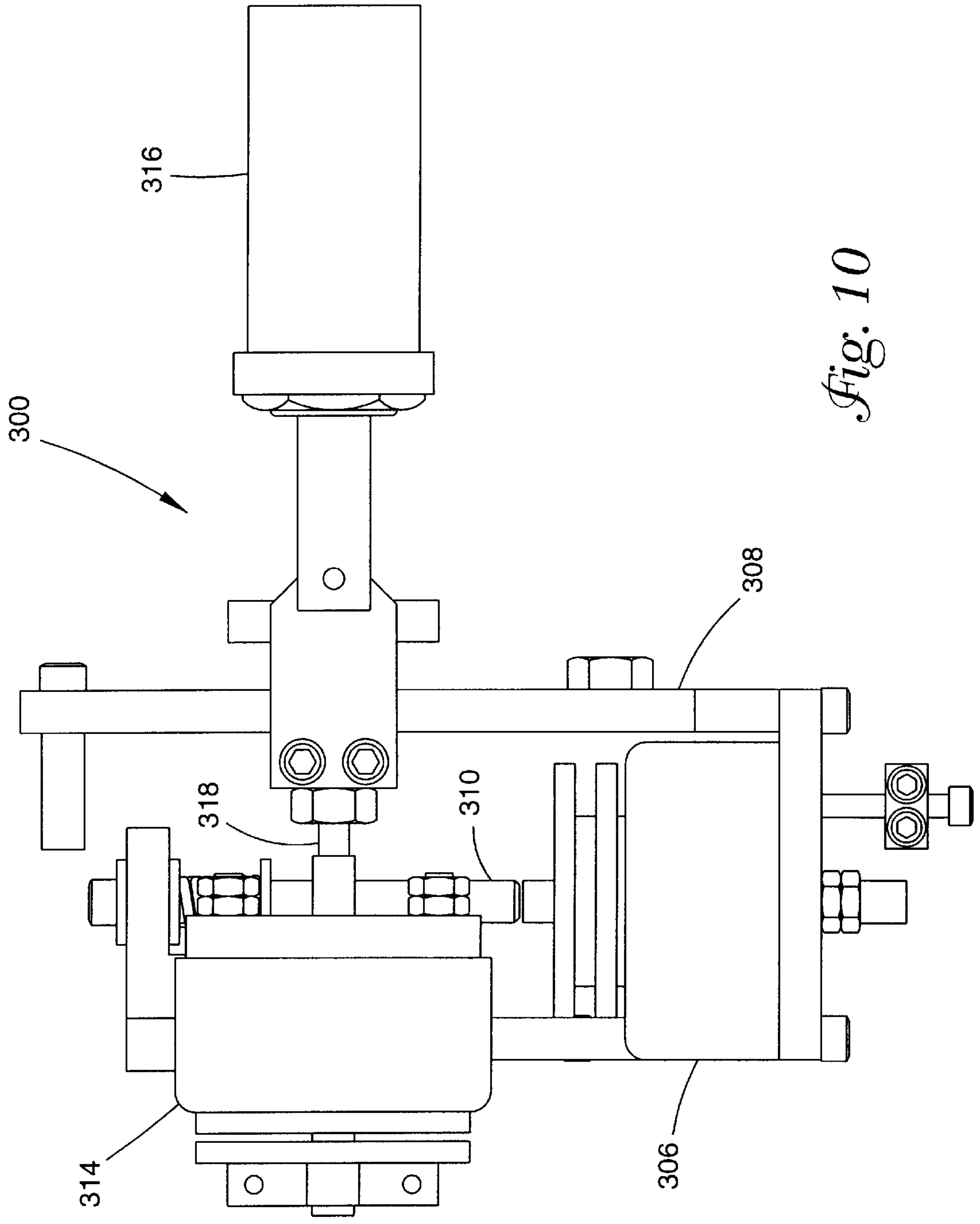
FIG. 10 shows a side elevational view of the separator assembly shown in FIG. 7.

Referring now to FIGS. 7, 8 and 9, the separator system 300 for the marker insertion apparatus 100 is shown. The separator system 300 includes an upper separating jaw 302 and a lower separating jaw 304. The jaws 302 and 304 move together horizontally as an assembly for separating end markers, as explained hereinafter, and the upper jaw 302 moves vertically for opening and closing the jaws. The upper jaw 302 is actuated by vertically extending solenoids

306, including a left solenoid 306A and a right solenoid 306B. The solenoids 306 mount on connector plates 308 to the upper jaw and a vertical stop 310 limits the motion of the solenoids 306 and the upper jaw 302. The upper jaw assembly 302 travels on vertical shafts 312A and 312B.

In a similar manner, horizontal movement of the upper and lower jaws 302 and 304 is actuated by a large horizontally mounted solenoid 314 as well as a longer stroke horizontally mounted solenoid 316. The power solenoid 314 provides the larger separation force necessary to pull the end marker from the roll 1000, as explained hereinafter. The longer stroke solenoid 316 provides a sufficient stroke to place the removed marker in the proper position for gripping, as explained hereinafter. A connector frame 318 imparts motion through an orifice in the assemblies frame 130 to the jaws 302 and 304. A horizontal stop 320 limits the travel of the jaws 302 and 304 on completion of the horizontal travel path. An angled arm 324 provides for connection of the jaws 302 and 304 to the horizontal solenoids 314 and 316.

The jaws 302 and 304 include optical sensors 330, shown more clearly in FIG. 8, for detecting the presence of a leading edge of a marker. Each of the optical sensors 330 includes an upper element in the upper jaw 302 and a vertically aligned corresponding lower element in the lower jaw 304. If the path between the upper and lower elements is blocked, the sensor 330 signals the processor. If both of the optical sensors 330 are blocked by the marker being in place at both ends, the sensors 330 indicate the correct position of the marker. If the sensor 330 at one or both ends of the marker are uncovered, the sensor 330 indicates to the processor the misalignment or other problem has occurred and that a marker is not aligned in the proper position. This signals the need to feed the marker further or, if unable to correct the misalignment, alerts the operator of a possible jam or misfeed.

The jaws 302 and 304 further include openings 336 at the sides of the jaws for receiving the gripper arms, as explained hereinafter. In the preferred embodiment, each of the markers has a length such that it extends slightly beyond the pinching surfaces of the jaws 302 and 304 so that when the jaws 302 and 304 are open, the ends of the marker may be gripped and removed with gripper arms, as explained hereinafter. The end surfaces of the markers do not have adhesive applied thereto, so that the marker does not adhere to the gripper arms. In addition, the separator assembly 300 includes guide blocks 338 which guide the spring-loaded gripper arms slightly together when the marker is gripped so that the arms are biased to a spread position whereby the marker is held under tension by the gripper arms for insertion into a book in an unbowed state.

Figure 11:
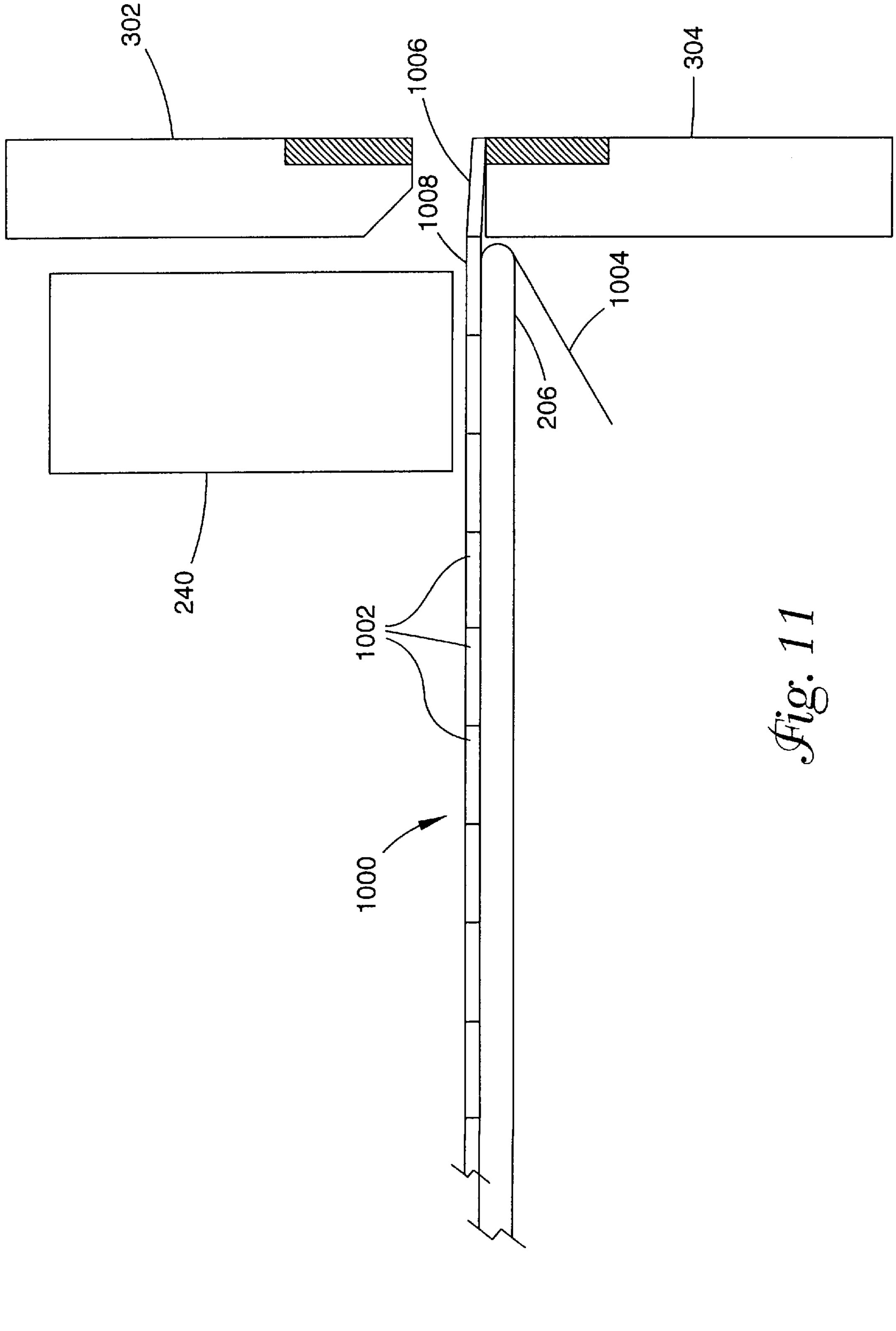
FIG. 11 shows a side sectional view of the separator jaws and the marker roll with an end marker separated from the backing sheet.
Figure 12:
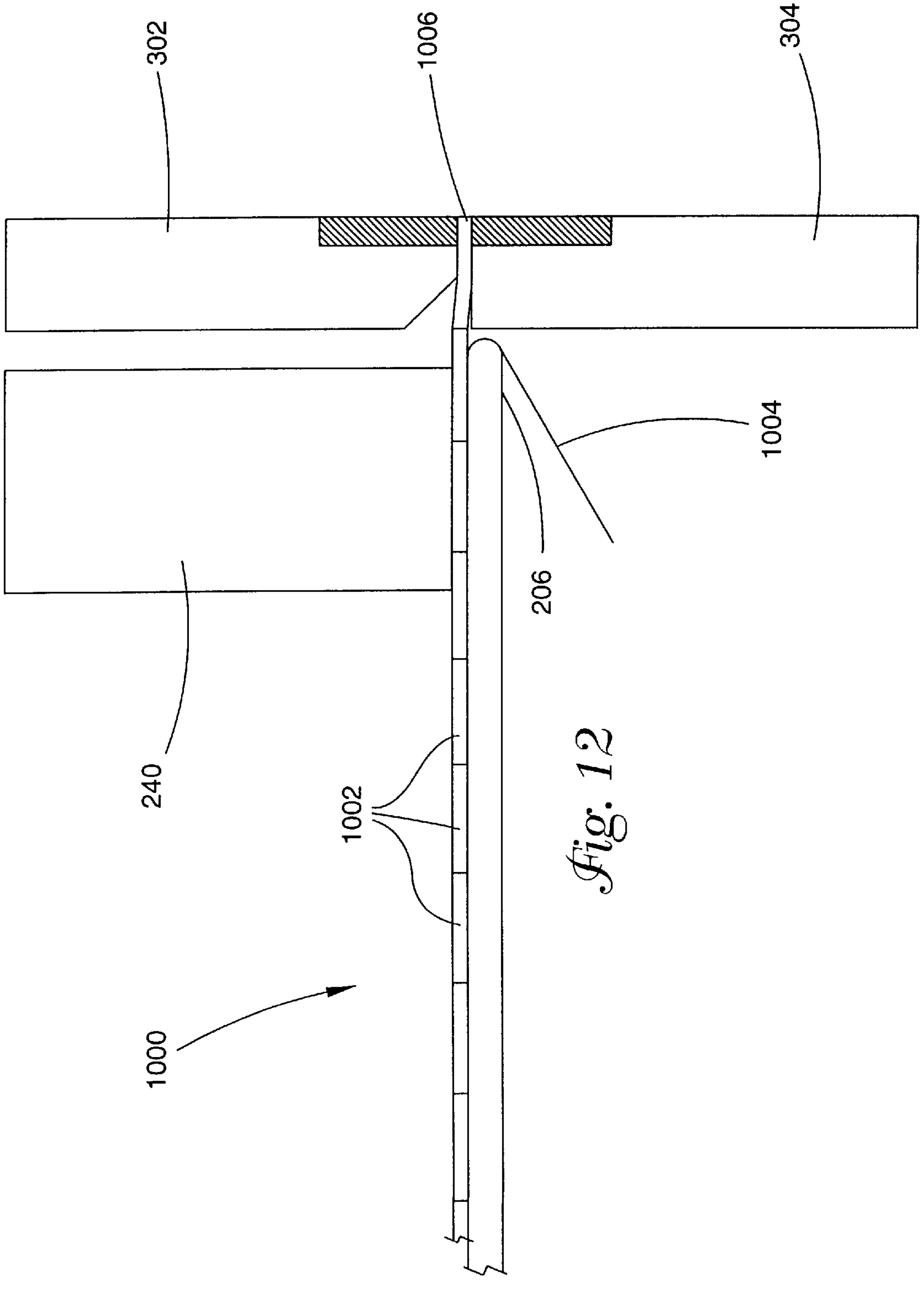
FIG. 12 shows a side sectional view of the separator jaws and the marker roll with an end marker gripped by the jaws.
Figure 13:
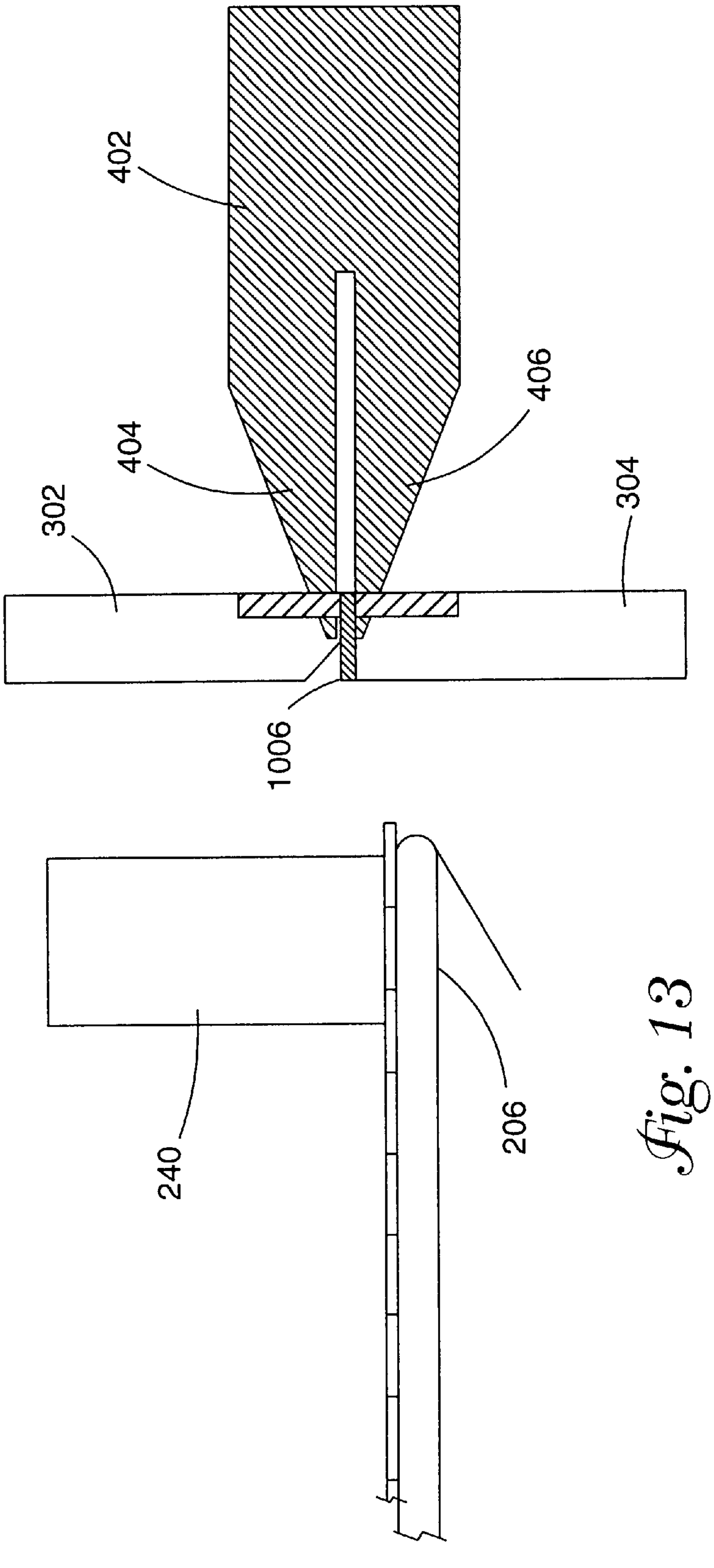
FIG. 13 shows a side sectional view of the separator jaws and the marker roll with an end marker separated by the jaws.

Referring now to FIGS. 11, 12 and 13, there is shown a detail of the separator jaws 302 and 304 and the interaction with the roll of marker material 1000. The roll 1000 includes a multiplicity of markers 1002 mounted on a backing sheet 1004. As shown in FIG. 11, an end marker 1006 separates from the backing sheet 1004 as the backing sheet 1004 is pulled over the peel bar 206, as explained hereinafter. As shown in FIG. 12, the jaws 302 and 304 close on the end marker 1006 and are then pulled away from the peel bar 206 and the roll 1000, so that the end marker 1006 separates from the next adjacent marker 1008, as explained in greater detail hereinafter.

Referring now to FIGS. 14, 15, 16A and 16B, the gripper system 400 for the marker inserting apparatus is shown. The gripper system 400 includes left and right gripper arms 402A and 402B. The gripper arms 402 include an upper finger 404 and a lower finger 406 which open and close for gripping the separated marker 1006, as explained hereinafter. In the embodiment shown, the gripper arms 402 are tubular assemblies with pivot links extending therein for actuating the pivoting upper finger 404 between an open and closed position. Guide pins 408 extending down from the ends of the arms 402 engage the blocks 338 of the separator assembly for guiding the arms 402 to a marker gripping position with the arms 402 moved slightly together. The arms 402 are spring loaded and attach to mounting blocks 410*a* and 410*b* which pivot about mounting shafts 412. Tension springs 414 pull the arms 402 outward. When the arms 402 are lifted so that the guide pins disengage the blocks 338, the arms spread further apart. The arms 402 mount to a base 420 and include a sensor flag 422 with slots 424, 426 and 428 which trip optical sensors 460 and 462 for detecting the rotational position of the arms. The arms 402 are rotated between the horizontal position shown in FIG. 16A and the vertically extending position, shown in FIG. 16B, driven by a stepper motor 430 about a rotational shaft 432. The rotating arm assembly mounts to a gripper assembly mounting frame 434. The gripper assembly 400 is vertically moveable between a raised position whereat the marker is pulled from the separator assembly 300 and a lowered inserting position. A sensor 464 supported on an arm 466 extends downward from the gripper assembly 400 and detects a flag on the V-arm assembly to control the depth to which the gripper assembly is lowered. An elongate vertically extending flag 468 mounts on the rear of the gripper assembly mounting frame 434 and trips sensors 530 and 532 mounted on the elevator assembly 500, shown in FIG. 17 for detecting the vertical position of the gripper assembly 400. As explained hereinafter, the gripping assembly 400 is supported by a cable attached to a mounting bracket 436. The elevator drive system runs a belt 506 connected to a belt pulley 440 which rides the belt 506 up and down as the elevator moves the gripper assembly 400 up and down. A solenoid 450 actuates the links of the gripper arms 402 to open and close the fingers 404 and 406.

Figure 14:
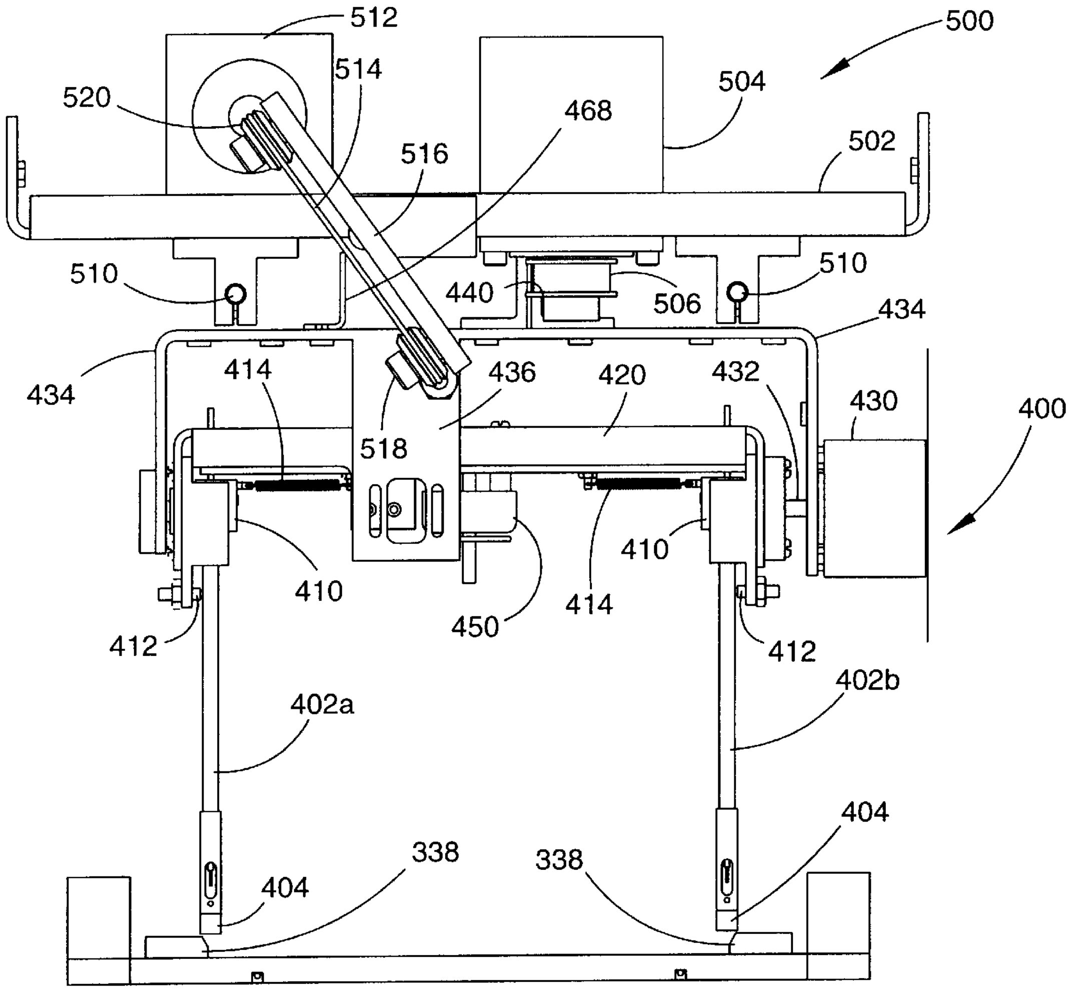
FIG. 14 shows a top plan view of the gripper assembly, the elevator assembly and the separator jaws for the marker insertion apparatus shown in FIG. 3.
Figure 15:
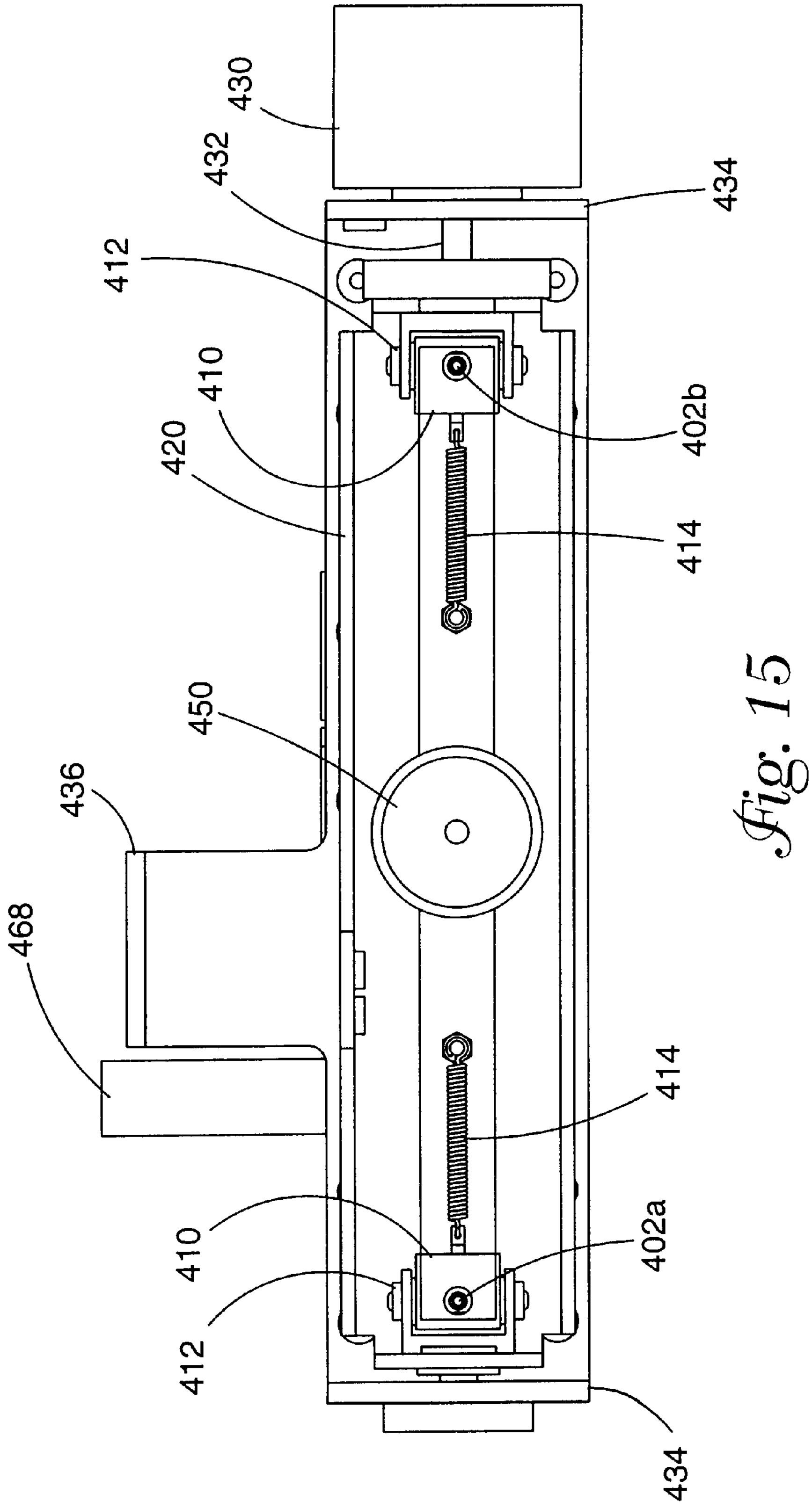
FIG. 15 shows an end elevational view of the gripper assembly shown in FIG. 14.
Figure 17:
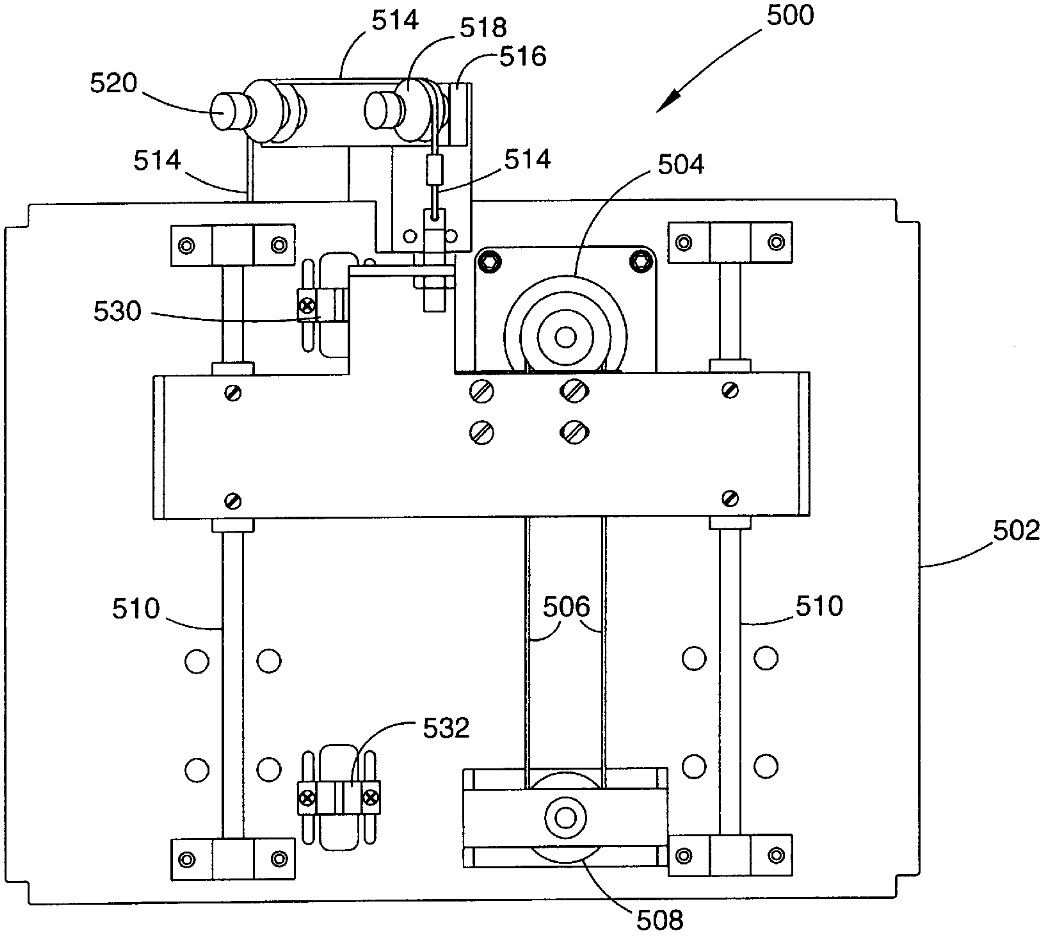
FIG. 17 shows an end elevational view of the elevator assembly shown in FIG. 14.
Figure 18:
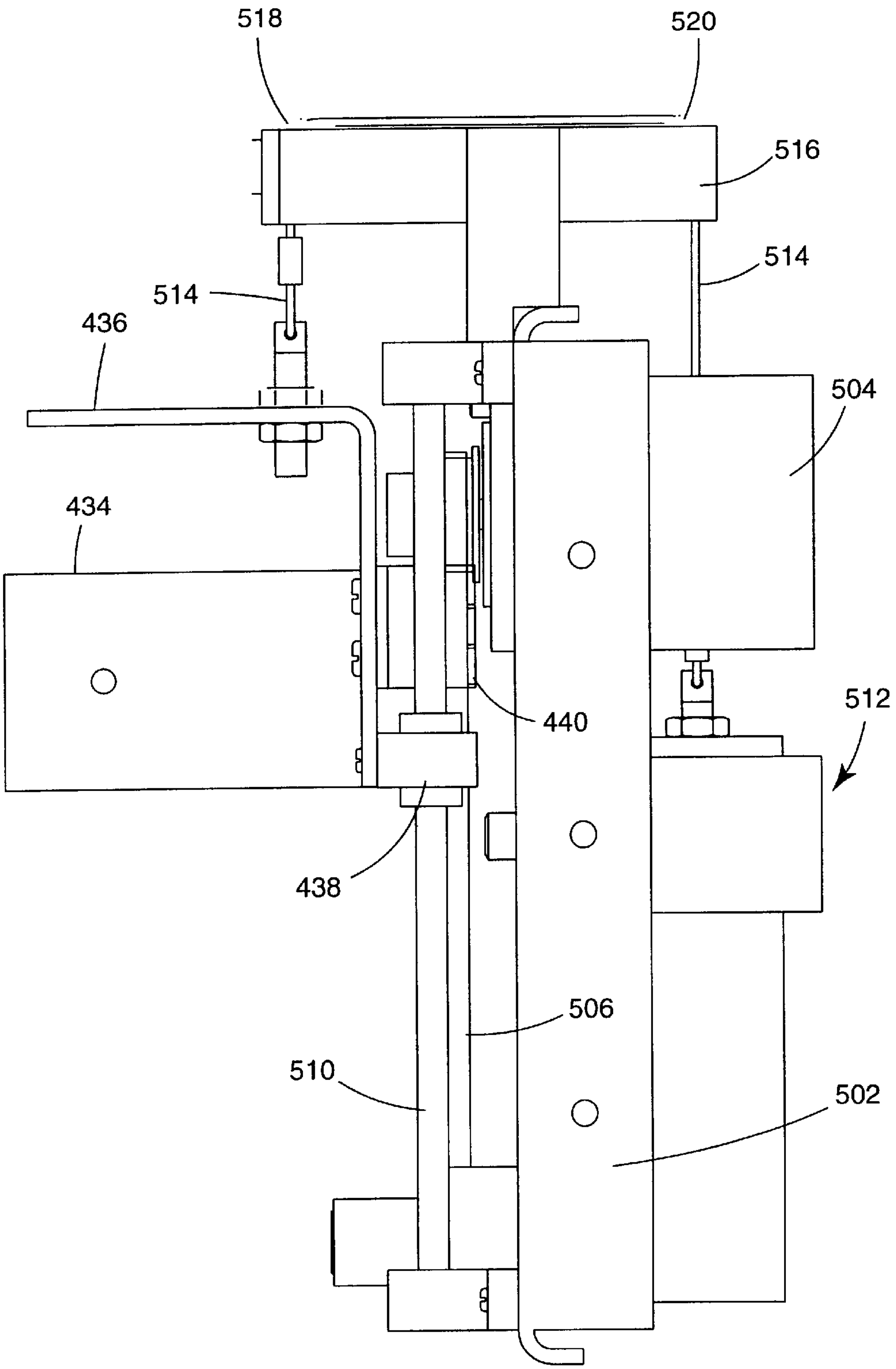
FIG. 18 shows a side elevational view of the elevator assembly shown in FIG. 17.

Referring now to FIGS. 14, 17 and 18, the elevator system 500 is shown. The elevator system 500 includes an elevator housing 502 which supports an elevator drive motor 504. The motor 504 drives the belt 506 which connects to the gripper assembly belt pulley 440 and a lower pulley 508. The gripper assembly 400 rides on sleeves 438 about vertical shafts 510. To decrease the effort needed to raise and lower the gripper assembly 400, a counterweight 512, weighing approximately the same as the gripper assembly 400, is employed. The counterweight 512 connects to the gripper assembly 400 via a cable 514. The cable 514 rides up and over pulleys 518 and 520 supported on a raised bracket 516. With the counterweight 512 offsetting the gripper assembly 400, the power needed to operate the elevator 500 is substantially reduced. The vertical position of the gripper assembly 400 is detected via sensors 530, 532 and the sensor 464 which detects the depth to which the insertion 1006 must be lowered, based on the height of the arm assembly of the page spreader system 600, as explained hereinafter. In this manner, the gripper assembly 400 is lowered to the proper depth.

Figure 19:
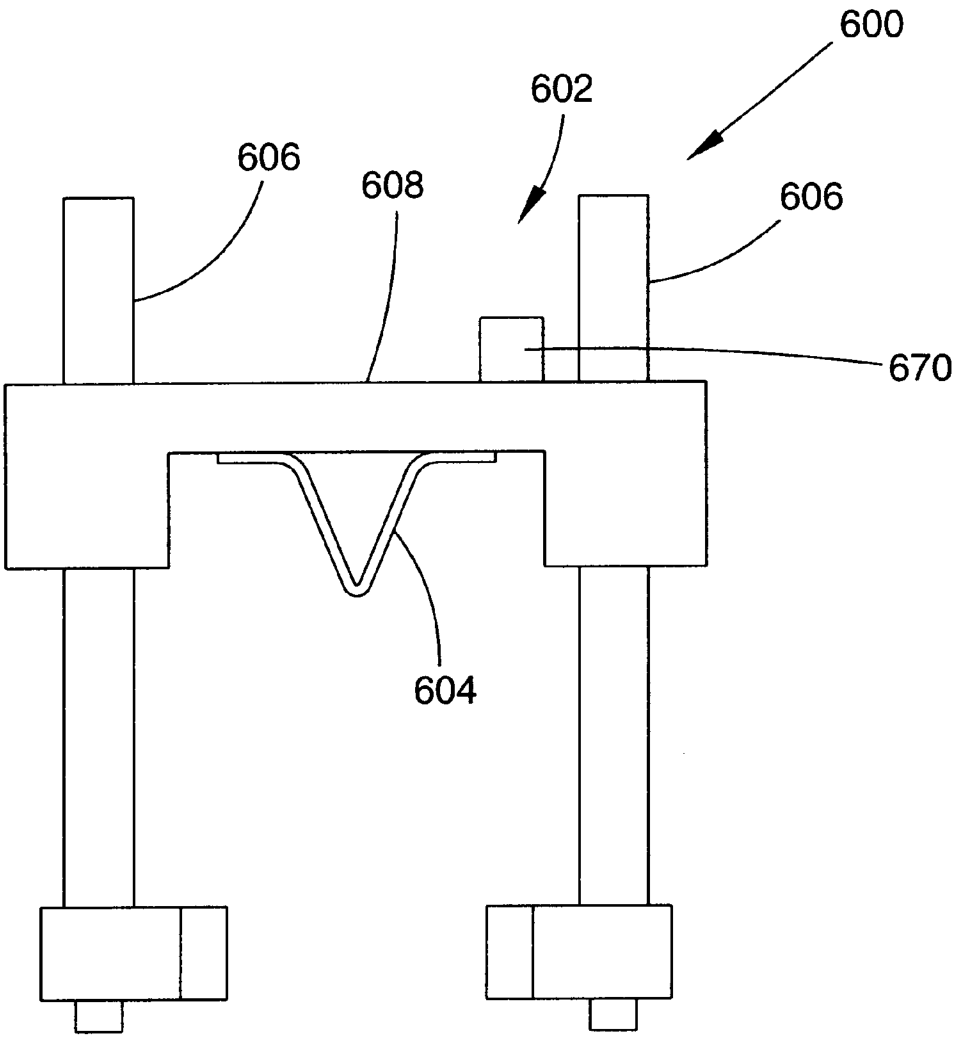
FIG. 19 shows an end elevational view of a first embodiment of the v-arm assembly for the marker insertion apparatus shown in FIG. 1.
Figure 21:
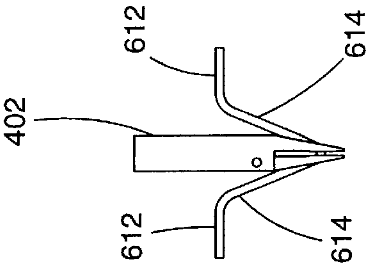
FIG. 21 shows an end detail view of the v-arm assembly shown in FIG. 19.
Figure 20:
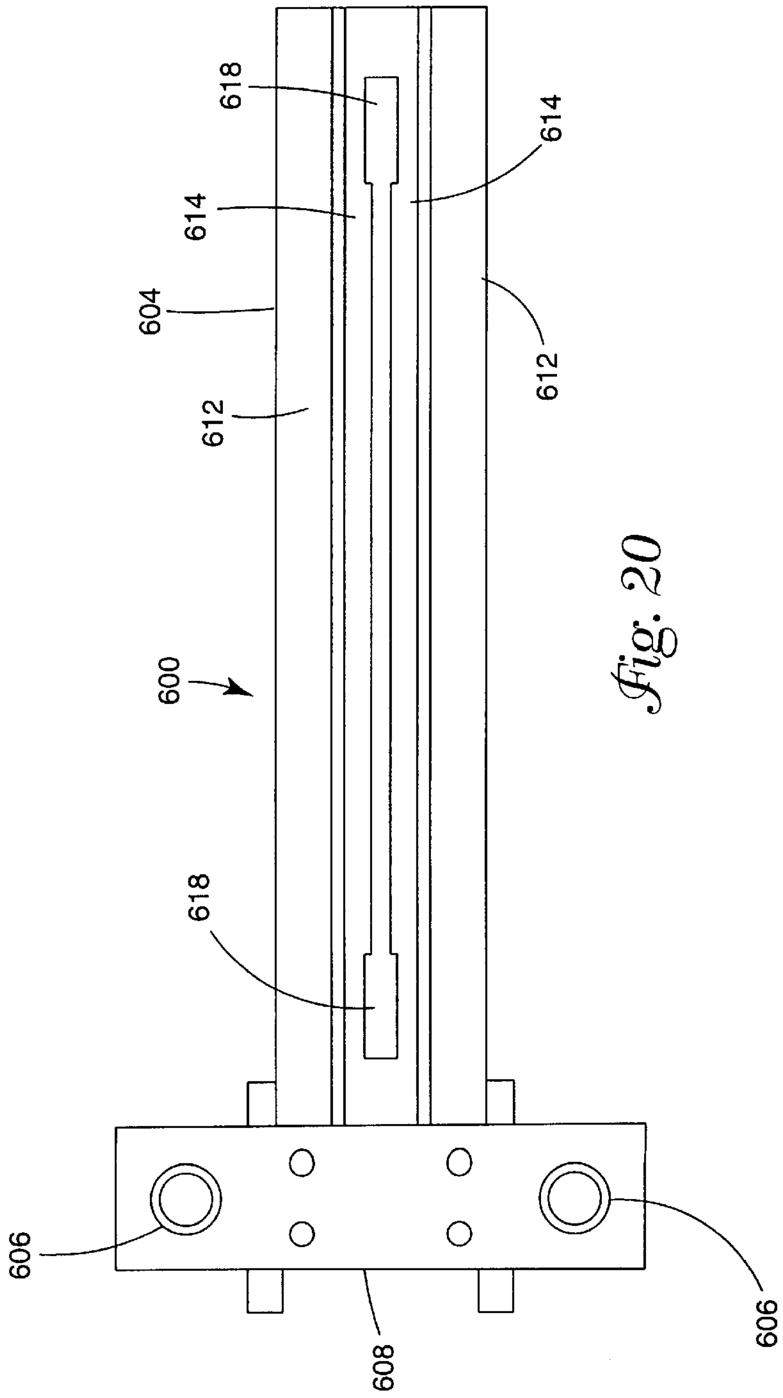
FIG. 20 shows a top plan view of the v-arm assembly shown in FIG. 19.

Referring now to FIG. 19, a first embodiment of the page spreader system 600 is shown. The page spreader system 600 includes a V-arm assembly 602 with an extended arm member 604. The arm assembly 602 mounts on a cross member 608 sliding up and down on support posts 606. A flag 670 follows the height of the cross member 608 and is detected when the gripper assembly is sufficiently lowered by the sensor 464. When the sensor 464 detects the flag 670, indicating that the gripper assembly 400 is lowered to the proper depth for marker insertion, the processor stops the elevator 500.

The arm member 604 includes substantially horizontal extending flanges 612 connecting to a V portion 614 for spreading the opposed book pages. The V portion 614 includes a lower slot 616 formed therein which includes widened end portions 618. The slot 616 receives the marker 1006 while the widened end portions receive the gripper arms 402 for inserting the marker into the book.

Figure 23:
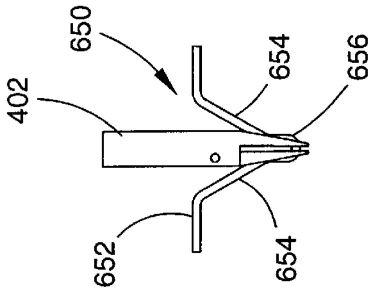
FIG. 23 shows an end detail view of the v-arm assembly shown in FIG. 22; and, FIG. 24 shows a control logic diagram for the marker insertion apparatus shown in FIG. 1.
Figure 22:
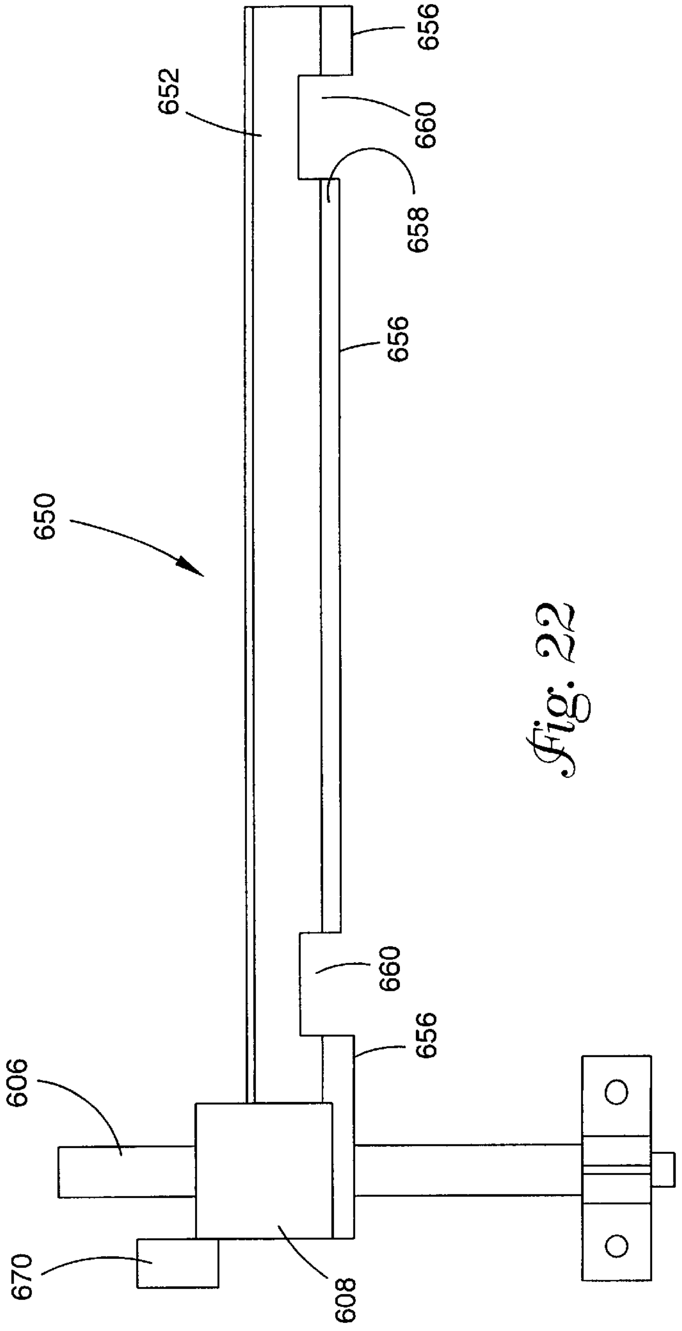
FIG. 22 shows a side elevational view of a second embodiment of the v-arm assembly for the marker insertion apparatus shown in FIG. 1.

Referring now to FIGS. 22 and 23, there is shown a second embodiment of the V-arm assembly, generally designated 650. The second embodiment of the V-arm assembly 650 includes a flange 652 extending substantially horizontally and a V portion 654. The V portion 654 includes a nearly vertical narrowed lower portion 656 forming a substantially Y-shaped profile. The narrowed lower portion 656 provides for inserting the V-arm assembly deeper between the pages of the book and near the binding. The V portion and lower portion 654 and 656 form a slot 658 and a widened end portion 660 for receiving the marker 1000. It can be appreciated that various book types and sizes may require different separation forces and configurations. The present invention provides for easily interchanging the V-bar assemblies 600 and 650 to best match the needs of the books.

Figure 24:
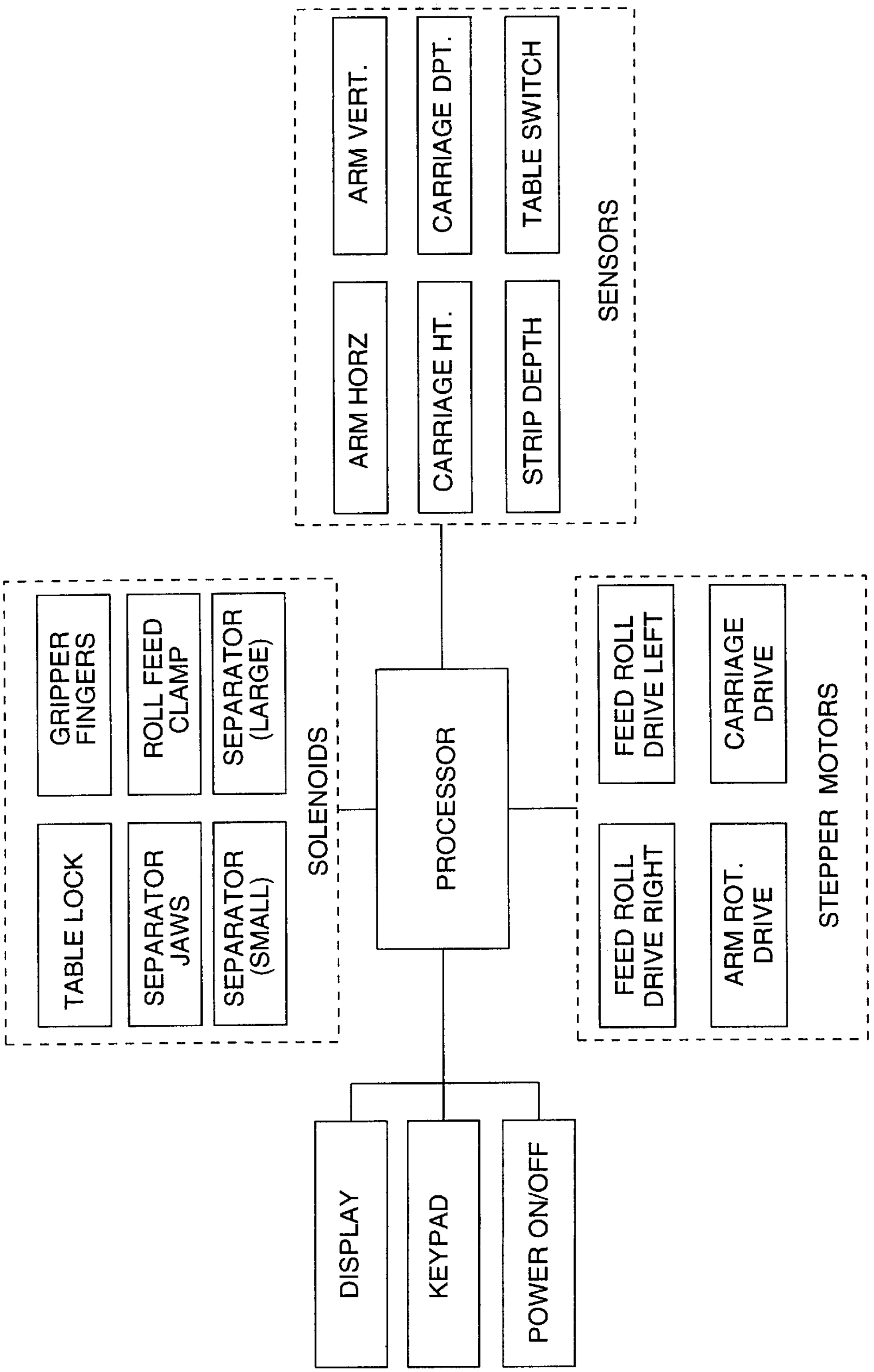

Referring now to FIG. 24, there is shown the control system for the marker insertion apparatus 100. The control system utilizes a central processor or logic controller to receive inputs and control the operation of the apparatus 100. The main inputs are made from the power on and off switch which controls the power to all systems and the key pad which may be used to clear jams, call up information about various aspects of the system under the display, and perform other functions as needed. The display receives outputs from the processor, including system readiness, information on jams or other problems, information regarding usage and information regarding the available supply of markers.

The actuation and control of the various assemblies is also controlled by the processor. The left and right feed rollers 208 are driven by separate stepper motors which are independently actuatable by the processor, after receiving alignment signals from the separator jaw sensors 330. In addition, the cartridge assembly has a solenoid controlling a clamp (shown at 240 in FIGS. 11, 12, and 13) against the roll 1000 so that the roll cannot feed out as the end marker 1006 is pulled away.

The separator assembly 300 includes solenoids which actuate the separator jaws between an open and closed position. In addition, a horizontally-extending large solenoid provides the initial power burst to separate the endmost marker 1006 from the roll 1000 and a longer stroke smaller separator solenoid to move the jaws 302 and 304 horizontally away from the feed bar 206 to move the separated marker in a position to be grabbed by the gripper arms 402.

The gripper assembly 400 and elevator assembly 500 are actuated by stepper motors controlling the rotation of the gripper assembly 400 and the drive belt for raising and lowering the gripper assembly 400. The gripper fingers 404 and 406 are opened and closed by actuation of a solenoid controlled by the processor. The presence of the marker on the jaws is detected by the optical sensors 330 positioned at each end of the jaws which provide for the processor sending a signal to close the gripper fingers when a marker is in a properly aligned position. In addition, the processor aligns the arm rotation from the sensors 460 and 462 indicating that the gripper arms are horizontal or that the arms are vertical. The height of the gripper assembly carriage drive is operated by the processor receiving inputs from sensors 530 and 532 indicating that the gripper assembly on the elevator 500 has reached the proper height and that the carriage is sufficiently lowered to a depth for marker insertion from a sensor on the lift arm assembly as detected by the sensor 464.

The tray is locked in position by actuating a solenoid to engage the table lock. A table switch indicates to the processor that the tray is in the fully-inserted position for actuating the lock and which allows actuation of the insertion apparatus 100 to insert a marker. When the insertion process is completed, the lock is disengaged and the tray may be slid out to remove the book.

Operation

Prior to operation, the marker insertion apparatus 100 is loaded by placing a roll 1000 in the cartridge assembly 200. The roll 1000 will typically have an end starter portion without markers 1002 which is threaded through the rollers until an endmost marker 1006 is at the end of the peel bar 206. It can be appreciated that the radius of the end of the peel bar 60 must be small enough that it prevents the less flexible individual markers 1002 from bending to follow the radius, while allowing the more flexible backing sheet 1004 to follow the radius, thereby separating the endmost marker 1006. The end portion and backing sheet 1004 are fed through the cartridge assembly and the empty backing sheet 1004 is collected and disposed or recycled. When the endmost marker 1006 is in a position intermediate the jaws 302 and 304, as shown in FIG. 11, the optical sensors 330 signal the presence of the marker 1006. At this point, the screen 108 will indicate that the insertion apparatus 100 is ready for placement of a marker 1006 into a book.

Should the sensors 330 not indicate the presence of a marker 1006, the drive rollers 208A and 208B are advanced as necessary. For instance, if only one of the ends of the marker 1006 is advanced into the necessary position, then the opposite drive roller 208A or 208B is actuated to advance the other end until both ends of the marker 1006 are properly aligned. In this manner, the roll 1000 and backing sheet 1004 are maintained in proper alignment for feeding through the cartridge 200 and positioning the markers 1006.

When the end marker 1006 is in proper position, the iseparator jaws 302 and 304 close onto the extended endmost marker 1006, as shown in FIG. 12, by firing vertical solenoids 306 to lower the upper jaw 302. The roll 1000 is locked and prevented from rotating so that additional material cannot be advanced and resists when the end marker 1006 is pulled. When the jaws 302 and 304 are gripping the endmost marker 1006, the horizontal solenoids 314 and 316 are actuated to move the jaws 302 and 304 horizontally away from the peel bar 206 and the roll 1000 to separate the endmost marker 1006 from the next adjacent marker 1008, as shown in FIG. 13. If the sensors 330 still indicate that the marker has been gripped, removed and retained by the jaws 302 and 304, the jaws 302 and 304 are moved away from the peel bar 206. The jaws 302 and 304 are then opened to allow the marker to be removed by the gripper arms.

The gripper arms 402 are positioned such that the fingers 404 and 406 are opened. As the jaws 302 and 304 are moved horizontally, the arms 402 engage the guide blocks 338 with the pins 408 so that the arms are moved slightly inward toward each other. However, the biasing springs 414A and 414B tend to pull the arms 402A and 402B outward away from one another. When the jaws 302 and 304 are moved fully outward so the marker is intermediate the fingers 404 and 406, the jaws 302 and 304 are opened.

At this stage, the marker 1006 is lying on the lower jaw 304, due primarily to gravity and the difference in surface area between the lower jaw 304 and the upper jaw 302 which contacts the marker 1006. The fingers 404 and 406 close on the marker 1006. The gripper assembly 400 is raised by the elevator assembly 500 so that the gripper arms 404 and 406 pull the marker 1006 up away from the peel bar 206. As the marker 1006 is gripped at both ends by the pairs of fingers 404 and 406, the marker 1006 is peeled away from the lower jaw 304 as it moves away. In the preferred embodiment, the jaws 302 and 304 are plasma coated to provide for easier separation of the marker 1006 from the jaws 302 and 304. As the arms 402 were forced inward by the guide blocks 338, the upward movement of the gripper assembly 400 away from the separator jaws 302 and 304 disengages the pins 408 from the guide blocks 338. Since the gripper arms 402 are biased outward by the springs 414, the arms 402 may move slightly outward away from each other when disengaging the guide blocks 338 if the marker is not already taut. The spring tension tightens the grip on the marker 1006 to ensure that the arms 402 grip the marker 1006 in a taut, unbowed position. At this stage, the gripper system 400 is holding a marker 1006 with the arms 402 in a horizontally-extended position, ready for insertion into a book.

As the separator system 300 is moved back to its original position, the sensors 330 signal the processor that there is no longer a marker 1006 present between the jaws 302 and 304. Therefore, the feed rollers 208 pull the backing sheet 1004 until the adjacent end marker 1008 has advanced to a position where it becomes the endmost marker 1006 peeled away from the backing sheet 1004, as shown in FIG. 11. This is the normal ready position of the separator assembly 300 and gripper assembly 400.

Figure 2:
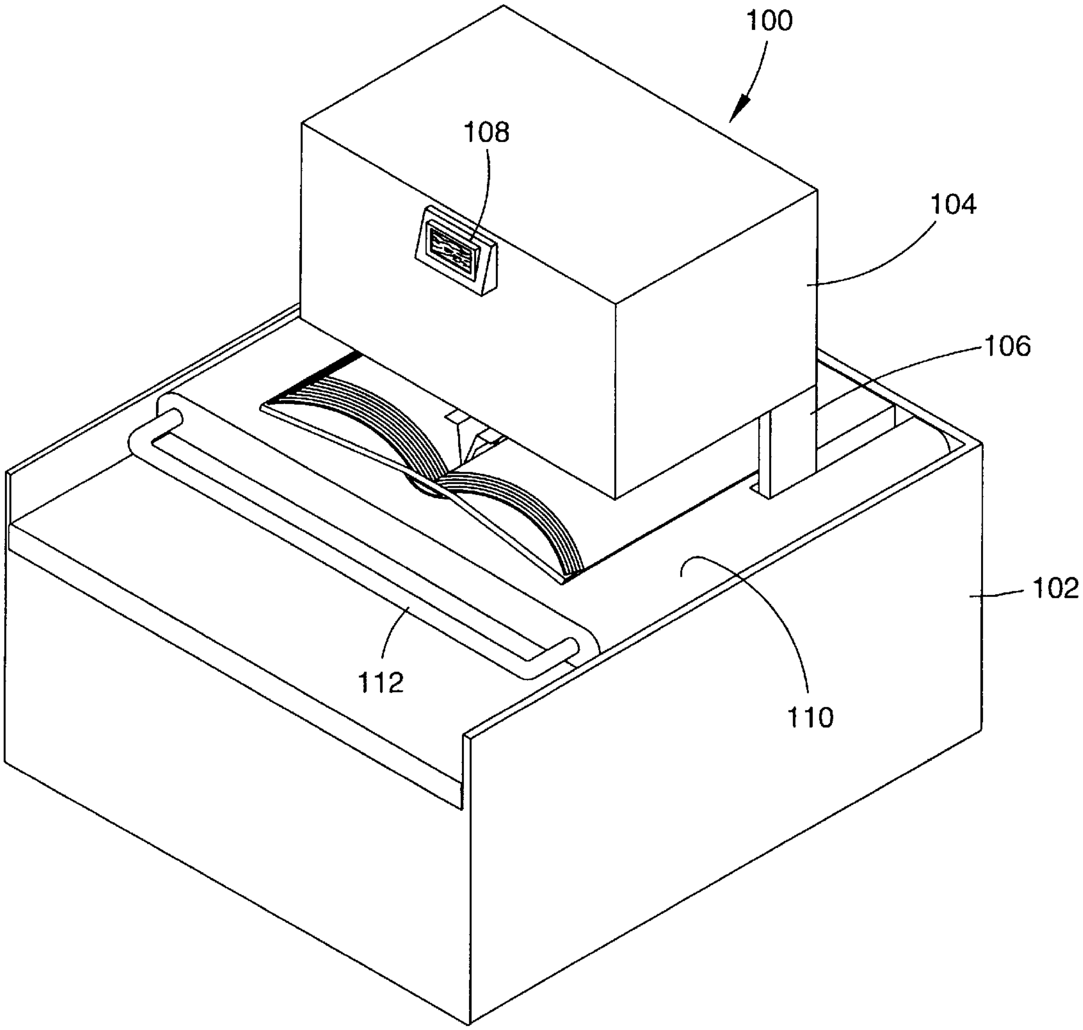
FIG. 2 shows a perspective view of the marker insertion apparatus shown in FIG. 1 with the loading tray in the insertion position.
Figure 16A:
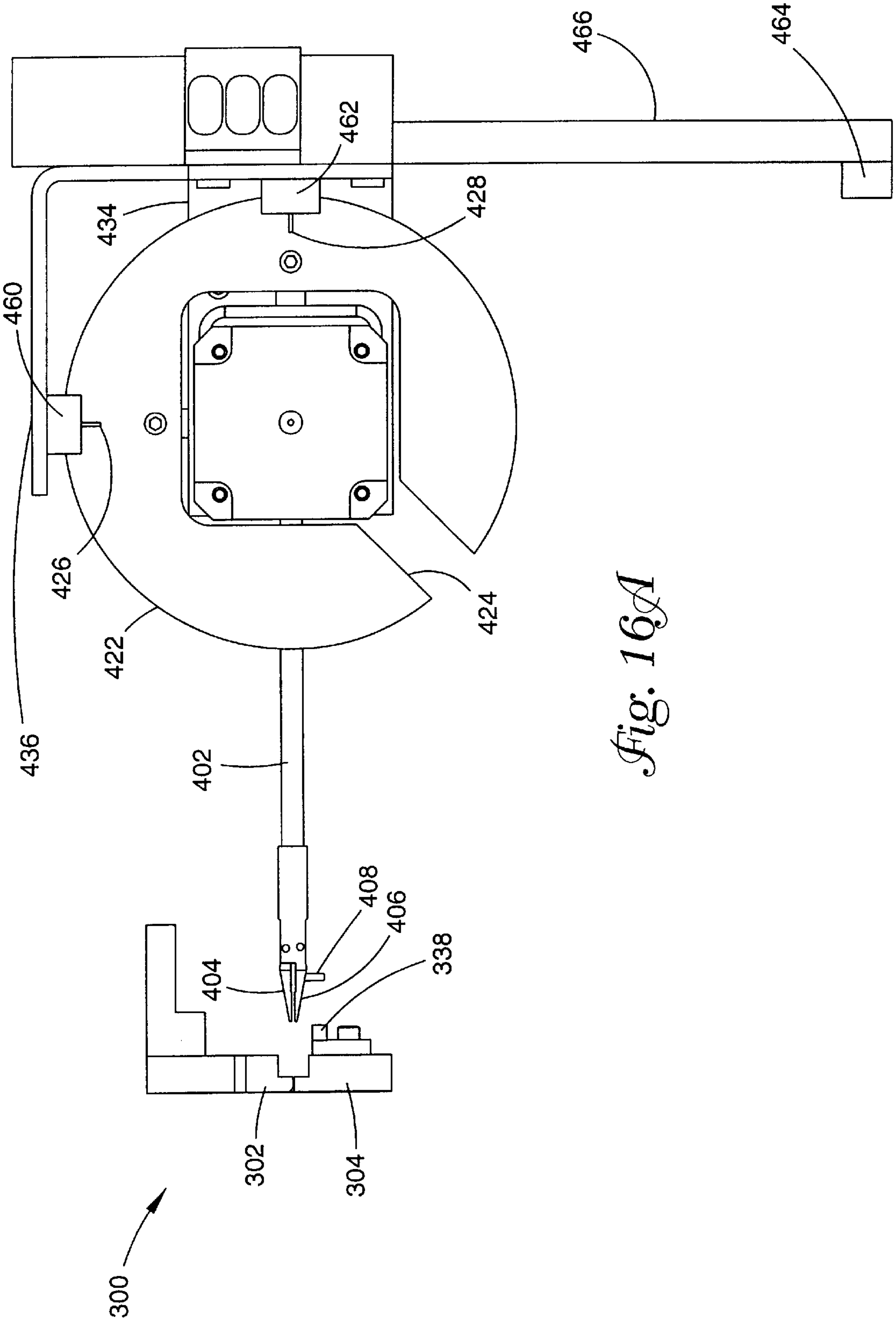
FIG. 16A shows a side elevational view of the gripper assembly shown in FIG. 15.
Figure 16B:
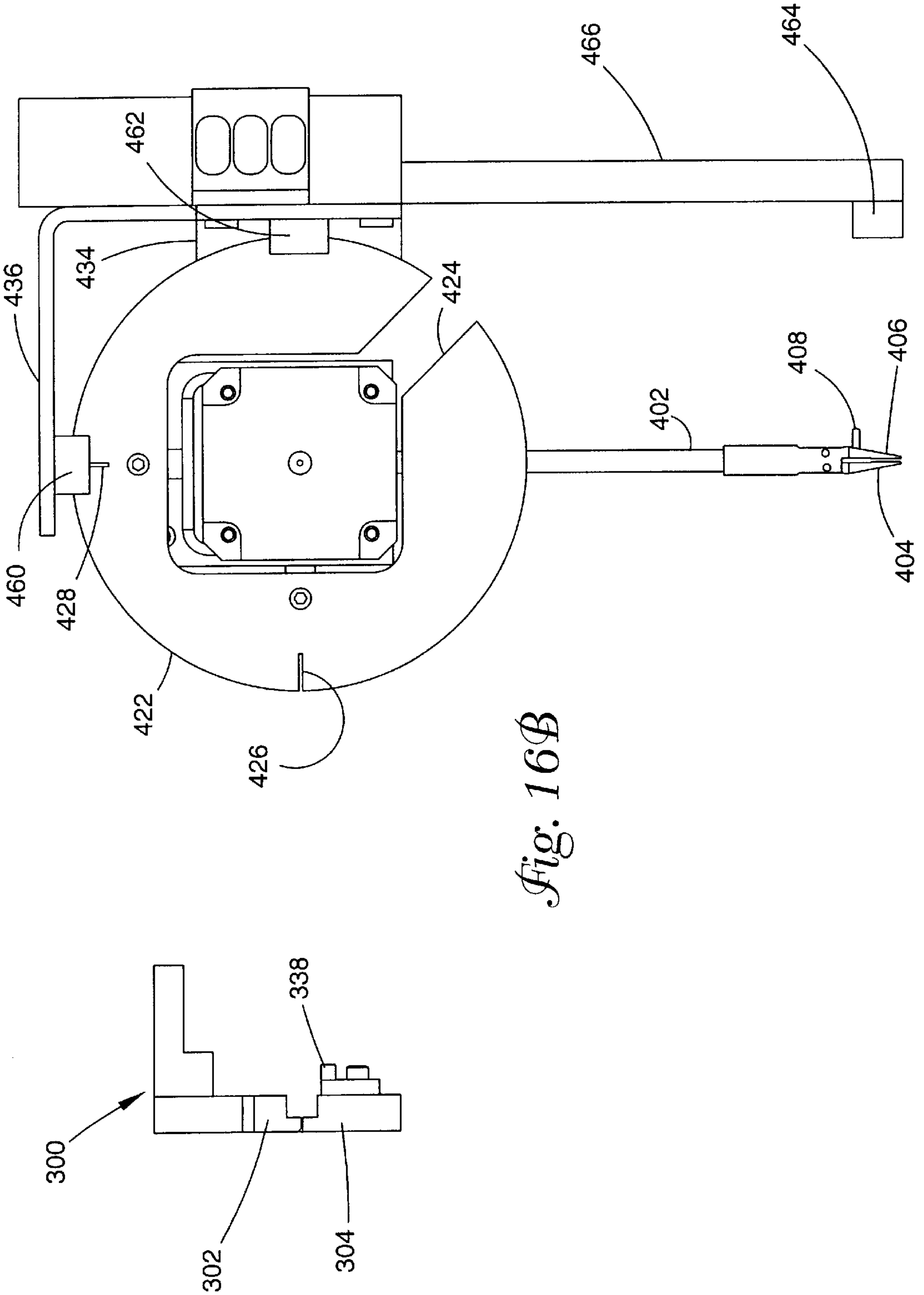
FIG. 16B shows a side elevational view of the gripper assembly shown in FIG. 15 rotated with the gripper arms. extended to a downward extending inserting position.

When the gripper assembly 400 is gripping a marker, the insertion operation may begin. In order to insert a marker into the book, an operator would turn the insertion apparatus 100 "on" through the key pad or screen 108 and receive a ready message on the screen. If there is a problem with feeding the markers 1006 or some other jam, an error message will indicate to the operator that maintenance or other clearing is required. When the tray 110 is fully extended, as shown in FIG. 1, the apparatus 100 is ready for receiving a book. The page spreader assembly 600 has the V-arm 604 in the raised position, as shown in FIG. 19. This allows the operator to place an open book beneath the extended V-arm 604 with the pages approximately equally divided between the left and right side of the book. When the book has been properly inserted, the V-arm 604 is manually lowered with the V portion 604 guiding the book into the properly aligned position and further separating the opposing pages of the book, as shown in FIG. 1. When the book has been properly positioned in the V-arm assembly 600, the V-arm 604 is sufficiently lowered close to the book's binding and the tray 110 is slid inward until the table lock is engaged, as shown in FIG. 2. The lock signals the processor that a book is in position for receiving a marker. The gripper assembly 400 is then rotated so that the arms 402 extend downward, as shown in FIG. 16B.

When the gripper assembly 400 is rotated so that the gripper arms 402 are substantially vertical, the elevator assembly 500 is actuated. The elevator assembly motor 504 is actuated to drive the belt 506, thereby lowering the gripper assembly 400. When the gripper assembly 400 has been lowered to a point wherein the position of the marker 1006, retained in the gripper arms 402, is sufficiently deep in relation to the depth of the page spreader assembly 600, by the sensor 464 reading flag 670, the elevator 500 is stopped. In this position, the marker 1006 should be inserted to a depth extending through the slot 616 of the V-arm 604. The processor signals the gripper arms 402 so that the fingers. 404 and 406 open, thereby releasing the marker 1006. The adhesive on the sides of the marker 1006 will adhere to at least one of the opposing pages so that the gripper arms 402 may be withdrawn upward, thereby leaving the marker 1006 inserted between the opposing pages of the book. It can be appreciated that since the gripper arms 402 are biased outward, the marker 1006 remains unbowed and is correctly placed in the book near the binding in a substantially aligned position running longitudinally parallel to the binding of the book. The tension on the marker 1006 decreases the possibility of the marker being skewed or bowed while being inserted, thereby improving accuracy of the placement and repeatability of the placement with the present placement system.

Once the marker 1006 has been released into the book, the processor actuates the elevator assembly 500 to raise the gripper assembly 400. When the sensor 530 detects that the gripper assembly 400 has reached the proper height for gripping the next marker, the elevator 500 is stopped. At this point, the arms 402 are rotated back to the substantially horizontal position. When the sensors 460 and 462 detect that the gripper arms 402 are again horizontal, the process is repeated for separating the next marker 1006 from the roll 1000 in the separator assembly 300 and removing the marker 1006 from the jaws 302 and 304 so that the gripper assembly 400 is again holding a marker ready for placement.

When the processor detects that the gripper assembly 400 has been raised and the arms 402 rotated back to the substantially horizontal position, the tray table lock is disengaged and the book having the marker inserted therein can be removed. The tray 110 may then be slid outward with the mechanisms safely raised upward back into the housing. 104. The tray 110 is then slid outward to the position shown in FIG. 1. The V-arm 604 is raised so that the book may be removed and is ready for use with an electronic article surveillance system. With the V-arm assembly 600 still raised, the next book is inserted and the process is repeated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for removing a marker from a length of marker material, having a multiplicity of adhesive coated individual markers mounted on a backing sheet, and applying the marker to a book, comprising:

a separator assembly for pulling an end marker from the length of material; and a gripper system for gripping the end marker, taking it from the separator assembly, and inserting it into the book.

2. An apparatus according to claim 1, further including a peel bar for separating the end marker from the backing sheet.

3. An apparatus according to claim 1, wherein the apparatus further comprises a cartridge assembly having a drum supporting a roll of the marker material.

4. An apparatus according to claim 1, wherein the separator assembly comprises a jaw device having an upper jaw and a lower jaw, wherein the jaw device is configured for closing the upper and lower jaws to grip the end marker.

5. An apparatus according to claim 4, wherein the gripper system comprises a pair of gripping arms and wherein the upper and lower jaws define an enlarged recess therebetween at both ends of the jaws for receiving the arms.

6. An apparatus according to claim 5, wherein the gripper system comprises a pair of rotatable arms each having finger portions at an extended end thereof.

7. An apparatus according to claim 6, wherein the rotatable arms further comprise means for biasing the arms apart.

8. An apparatus according to claim 7, wherein the jaw device includes guide members engaging the rotatable arms in the separated position, thereby pushing ends of the arms inward for gripping the end marker and wherein upon disengaging the guide members, the arms grip the end marker under tension.

9. An apparatus according to claim 4, wherein the upper and lower jaws grip the end marker substantially along the entire length of the end marker.

10. An apparatus according to claim 4, further comprising a sensor for sensing the position of the end marker relative to the jaw device.

11. An apparatus according to claim 1, wherein the separator assembly pulls the end marker transversely to a longitudinal direction of the marker.

12. An apparatus according to claim 1, further comprising a page spreader for spreading opposing pages of the book.

13. An apparatus according to claim 12, further comprising a sensor for sensing the position of the page spreader.

14. An apparatus according to claim 12, wherein the page spreader includes guide means for guiding the end marker into position.

15. An apparatus according to claim 12, wherein the page spreader comprises a substantially V-shaped bar.

16. An apparatus according to claim 15, wherein the V-shaped bar includes a slot formed therethrough at a lower portion of the bar and wherein ends of the slot widen.

17. An apparatus according to claim 1, wherein the separating means comprises a jaw device having an upper jaw member and lower jaw member configured for moving together and apart, the jaw device being movable toward a position at which the end marker is intermediate the upper and lower jaw members, wherein upon moving the jaw members together, the jaws grip the end marker, and wherein moving the closed jaw device transversely away from the end marker separates the end marker from an adjacent marker.

18. An apparatus for removing a marker from a length of marker material having a multiplicity of individual markers having an adhesive-coated portion and at least one non-adhesive-coated portion, and applying the marker to a book, comprising:

(a) an assembly for gripping a marker and separating it from the length of marker material; and (b) an assembly for holding at least one of the non-adhesive portions of the marker and inserting the marker into the book.

19. An apparatus for removing a marker from a length of marker material having a multiplicity of adhesive coated individual markers, and applying the marker to a book, comprising an assembly for gripping two opposed ends of a marker, and inserting it into the book, wherein the assembly maintains the marker in tension to present the marker in proper position for insertion into the book.

20. An apparatus for automatically inserting a marker into a book, comprising:

a pair of substantially parallel gripper arms rotatably mounted, rotating between a substantially vertical position and a substantially horizontal position;

means for biasing the gripper arms outward away from one another;

gripper fingers at an extended end of the gripper arms actuatable between an open and a closed position; and means for raising and lowering the gripper arms wherein the gripper arms are adapted to support the marker and insert the marker into the book.

21. An apparatus according to claim 20, further comprising means for sensing the height of the gripper arms.

22. An apparatus according to claim 21, further comprising means for sensing the height of the gripper arms relative to the book.

23. An apparatus according to claim 20, further comprising means for forcing the gripper arms inward.

* * * * *

UNITED STATES PATENT AND TRADEMARK OFFICE

CERTIFICATE OF CORRECTION

PATENT NO. : 6,167,933 B1
DATED : January 2, 2001
INVENTOR(S) : Donald P. DeVale et al.

It is certified that error appears in the above-identified patent and that said Letters Patent is hereby corrected as shown below:

Column 1,
Line 61, delete "manufacturing" and insert in place thereof -- Manufacturing --.

Column 2,
Line 59, delete "into." and insert in place thereof -- into --.

Column 4,
Line 29, delete "marker." and insert in place thereof -- marker --.
Line 61, delete "arms." and insert in place thereof -- arms --.

Column 10,
Line 48, delete "iseparator" and insert in place thereof -- separator --.

Column 12,
Line 7, delete "fingers." and insert in place thereof -- fingers --.
Line 63, "inserting" should start a paragraph.

Signed and Sealed this

Twenty-first Day of May, 2002

*Attest:*

JAMES E. ROGAN

*Attesting Officer*

*Director of the United States Patent and Trademark Office*